US012804600B2

(12) United States Patent
Hong

(10) Patent No.: US 12,804,600 B2
(45) Date of Patent: Nov. 17, 2026

(54) METHOD AND DEVICE OF PROCESSING INFORMATION

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 262 days.

(21) Appl. No.: 18/290,151

(22) PCT Filed: May 10, 2021

(86) PCT No.: PCT/CN2021/092908
§ 371 (c)(1),
(2) Date: Nov. 9, 2023

(87) PCT Pub. No.: WO2022/236642
PCT Pub. Date: Nov. 17, 2022

(65) Prior Publication Data
US 2024/0357550 A1 Oct. 24, 2024

(51) Int. Cl.
*H04W 68/02* (2009.01)
*H04W 60/00* (2009.01)
*H04W 68/12* (2009.01)

(52) U.S. Cl.
CPC ......... *H04W 68/02* (2013.01); *H04W 60/005* (2013.01); *H04W 68/12* (2013.01)

(58) Field of Classification Search
CPC .... H04W 68/02; H04W 68/12; H04W 60/005
See application file for complete search history.

(56) References Cited

U.S. PATENT DOCUMENTS

| | | | | |
|---|---|---|---|---|
| 2021/0105866 A1 | 4/2021 | Kavuri et al. | | |
| 2022/0053448 A1* | 2/2022 | Velev | H04W 76/27 | |
| 2023/0080113 A1* | 3/2023 | Hong | H04W 68/02 370/329 | |

FOREIGN PATENT DOCUMENTS

| | | |
|---|---|---|
| CN | 102014484 A | 4/2011 |
| CN | 108471626 A | 8/2018 |
| CN | 111278107 A | 6/2020 |

(Continued)

OTHER PUBLICATIONS

International Search Report of PCT/CN2021/092908 dated Dec. 6, 2021 with English translation, (4p).

(Continued)

*Primary Examiner* — Jinsong Hu
*Assistant Examiner* — Farideh Madani
(74) *Attorney, Agent, or Firm* — Arch & Lake LLP; Hao Tan; Shen Wang

(57) ABSTRACT

A method for processing information performed is provided. A multi-card UE determines that the multi-card UE supports a paging cause capability, and sends first information to an access network device. The first information includes multi-card mode indication information and paging cause support indication information. The multi-card mode indication information is configured to indicate that the multi-card UE has at least two SIMs in an operational state or that it needs to use a capability supported by the multi-card UE, and the paging cause support indication information is configured to indicate that the multi-card UE supports the paging cause capability.

14 Claims, 9 Drawing Sheets

(56) References Cited

FOREIGN PATENT DOCUMENTS

| | | | | | |
|---|---|---|---|---|---|
| WO | 2020209620 | A1 | | 10/2020 | |
| WO | 2020256489 | A1 | | 12/2020 | |
| WO | 2021060893 | A1 | | 4/2021 | |
| WO | WO-2021066562 | A1 | * | 4/2021 | .......... H04W 68/005 |

OTHER PUBLICATIONS

Qualcomm Incorporated, et al., "Introduction of MUSIM capability exchange", 3GPP TSG-WG SA2 Meeting #144E e-meeting S2-2102342 Elbonia, Apr. 12-Apr. 16, 2021, S2-2102342 (29p).
Vivo, et al., "Introduction of MUSIM capability exchange". 3GPP TSG-WG SA2 Meeting #145E e-meeting S2-2103987 May 17-28, 2021 (revision of S2-2102342), (29p).
3GPP TS 23.501 V18.3.0 (Sep. 2023); Technical Specification Group Services and System Aspects; System architecture for the 5G System (5GS); Stage 2 (Release 18), (686p).
3GPP TS 23.502 V18.3.0 (Sep. 2023); Technical Specification Group Services and System Aspects; Procedures for the 5G System (5GS); Stage 2 (Release 18), (889p).
3GPP TR 23.761 V17.0.0 (Jun. 2021); Technical Specification Group Services and System Aspects; Study on system enablers for devices having multiple Universal Subscriber Identity Modules (USIM) (Release 17), (108p).
The first Office Action issued in Application CN202180001496.2, dated Mar. 21, 2025, with English translation, (18p).
Qualcomm Incorporated, et al., "Introduction of MUSIM capability exchange", 3GPP TSG-WG SA2 Meeting #145E e-meeting Elbonia, May 17-May 28, 2021, S2-210xxxx, (revision of S2-2102342), (31p).
Qualcomm Incorporated, et al., "Introduction of MUSIM capability exchage", 3GPP TSG-WG SA2 Meeting #145E e-meeting Elbonia, May 17-May 28, 2021, S2-210xxxx, (revision of S2-2102346), (19p).

* cited by examiner

METHOD AND DEVICE OF PROCESSING INFORMATION

CROSS-REFERENCE TO RELATED APPLICATIONS

The present application is a U.S. National Stage of International Application No. PCT/CN2021/092908 filed on May 10, 2021, the entire contents of which are incorporated herein by reference for all purposes.

BACKGROUND

Currently, most user equipments (UEs) such as mobile phone can support a plurality of universal subscriber identity modules (SIMs), which can be signed with the same operator or with different operators. For example, depending on services and costs offered by different operators, the UE may choose one of the plurality of SIMs to receive mainly phone calls and another SIM thereof to receive data services.

Nowadays, it mainly solves some problems in the multi-card UE such as how to avoid paging collision between two SIMs, how the SIM that is currently serving leaves the network thereof to respond to the paging of another SIM, and so on.

SUMMARY

The present disclosure relates to, but is not limited to, the field of communication technology, and in particular, relates to a method and device for processing information, a communication device, and a storage medium.

According to a first aspect of the present disclosure, some embodiments provide a method for processing information performed by a multi-card UE, including:

determining that the multi-card UE supports a paging cause capability; and sending first information to an access network device, the first information including multi-card mode indication information and paging cause support indication information, wherein the multi-card mode indication information is configured to indicate that the multi-card UE has at least two SIMs in an operational state or that it needs to use a capability supported by the multi-card UE, and the paging cause support indication information is configured to indicate that the multi-card UE supports the paging cause capability.

According to a second aspect of the present disclosure, some embodiments provide a method for processing information performed by an access network device, including:

receiving first information sent by a multi-card UE, the first information including multi-card mode indication information and paging cause indication information, wherein the multi-card mode indication information is configured to indicate that the multi-card UE has at least two SIMs in an operational state or that it needs to use a capability supported by the multi-card UE, and the paging cause support indication information is configured to indicate that the multi-card UE supports the paging cause capability; and sending the first information to a core network device.

According to a third aspect of the present disclosure, some embodiments provide a method for processing information performed by a core network device, including:

receiving first information sent by an access network device, the first information including multi-card mode indication information and paging cause support indication information, wherein the multi-card mode indication information is configured to indicate that the multi-card UE has at least two SIMs in an operational state or that it needs to use a capability supported by the multi-card UE, and the paging cause support indication information is configured to indicate that the multi-card UE supports the paging cause capability.

According to a fourth aspect of the present disclosure, some embodiments provides a device of processing information, including:

a determining module, configured to determine that the multi-card UE supports a paging cause capability; and a sending module, configured to send first information to an access network device, the first information including multi-card mode indication information and paging cause support indication information, wherein the multi-card mode indication information is configured to indicate that the multi-card UE has at least two SIMs in an operational state or that it needs to use a capability supported by the multi-card UE, and the paging cause support indication information is configured to indicate that the multi-card UE supports the paging cause capability.

According to a fifth aspect of the present disclosure, some embodiments provide a device of processing information, including:

a receiving module, configured to receive first information sent by a multi-card UE, the first information including multi-card mode indication information and paging cause indication information, wherein the multi-card mode indication information is configured to indicate that the multi-card UE has at least two SIMs in an operational state or that it needs to use a capability supported by the multi-card UE, and the paging cause support indication information is configured to indicate that the multi-card UE supports the paging cause capability; and a sending module, configured to send the first information to a core network device.

According to a sixth aspect of the present disclosure, some embodiments provide a device of processing information, including:

a receiving module, configured to receive first information sent by an access network device, the first information including multi-card mode indication information and paging cause support indication information, wherein the multi-card mode indication information is configured to indicate that the multi-card UE has at least two SIMs in an operational state or that it needs to use a capability supported by the multi-card UE, and the paging cause support indication information is configured to indicate that the multi-card UE supports the paging cause capability.

According to a seventh aspect of the present disclosure, some embodiments provide a communication device, including:

a processor; and a memory storing executable instructions by the processor, wherein the processor is configured to, when running the executable instructions, implement the method for processing information according to any embodiment of the present disclosure.

According to an eighth aspect of the present disclosure, some embodiments provide a computer storage medium having a computer executable program stored thereon that, when being executed by a processor, implements the method for processing information according to any embodiment of the present disclosure.

It should be understood that the above general description and the following detailed descriptions are exemplary and explanatory only and do not limit the embodiments of the present disclosure.

DETAILED DESCRIPTION

Exemplary embodiments will be described in detail herein, examples of which are illustrated in the accompanying drawings. When the following description is made with reference to the drawings, the same numerals in different drawings refer to the same or similar elements unless otherwise indicated. The implementations described in the exemplary embodiments below are not intended to represent all implementations of the embodiments of the present disclosure. Rather, they are merely examples of devices and methods according to some aspects of the embodiments of the present disclosure as recited in the appended claims.

The terms used in embodiments of the present disclosure are used solely for the purpose of describing particular embodiments and are not intended to limit embodiments of the present disclosure. The singular forms of "a" and "the" as used in the embodiments of the present disclosure and the appended claims are also intended to include the plural forms, unless the context clearly indicates otherwise. It should also be understood that the term "and/or" as used herein refers to and includes any or all possible combinations of one or more of the associated listed items.

It should be understood that although the terms first, second, third, and the like may be used in embodiments of the present disclosure to describe various information, such information should not be limited by these terms. These terms are used only to distinguish information of the same type from one another. For example, without departing from the scope of embodiments of the present disclosure, first information may also be referred to as second information, and similarly, the second information may also be referred to as the first information. Depending on the context, the word "if" as used herein may be interpreted as "while . . . " or "when . . . " or "in response to determining that . . . ".

Figure 1:
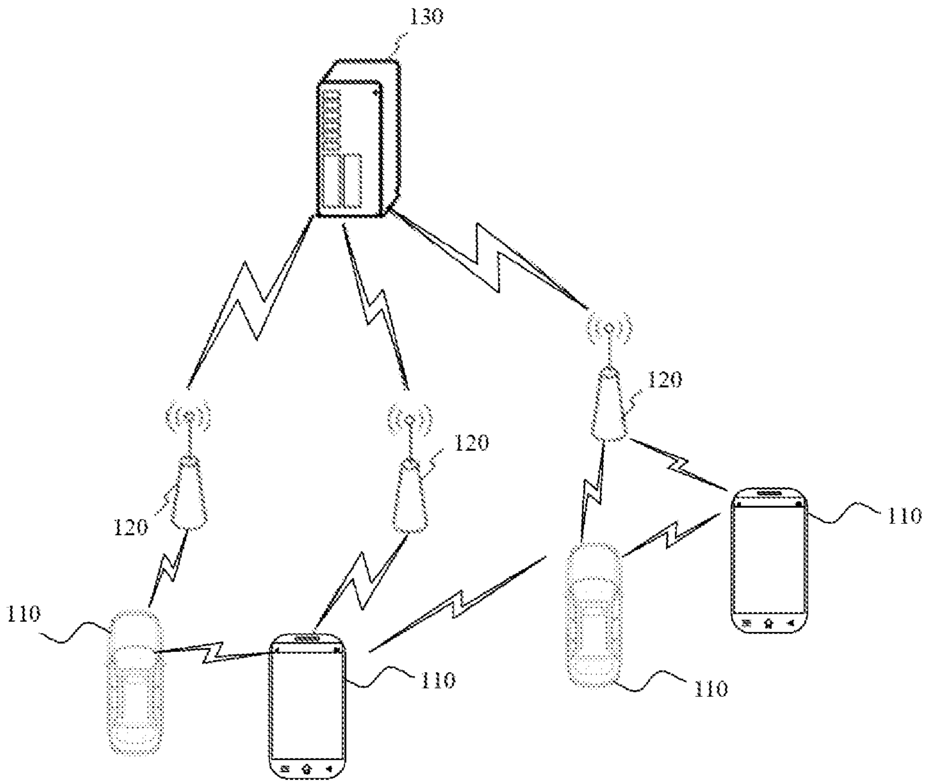
FIG. 1 is a schematic structure diagram of a wireless communication system according to an exemplary embodiment of the present disclosure.

FIG. 1 illustrates a schematic structure diagram of a wireless communication system according to an embodiment of the present disclosure. As shown in FIG. 1, the wireless communication system is a communication system based on cellular mobile communication technology, and the wireless communication system may include a plurality of user equipments 110 and a plurality of base stations 120.

The user equipment 110 may be a device providing voice and/or data connectivity to a user. The user equipment 110 may communicate with one or more core networks via a Radio Access Network (RAN). The user equipment 110 may be an IoT user device such as a sensor device, mobile phone (or "cellular" phone), and may be a computer with an IoT user device, for example, which may be a fixed, portable, pocket-sized, handheld, computer-built or vehicle-mounted device. For example, it may be a station (STA), subscriber unit, subscriber station, mobile station, mobile, remote station, access point, remote terminal, access terminal, user terminal, user agent, user device, or user equipment. In one embodiment, the user equipment 110 may be an unmanned aerial vehicle device. In one embodiment, the user equipment 110 may be a vehicle-mounted device, for example, a trip computer with a wireless communication capability, or a wireless user device externally connected to a trip computer. In one embodiment, the user equipment 110 may be a roadside device, for example, a street light, a signal light or other roadside device with a wireless communication capability.

The base station 120 may be a network-side device in the wireless communication system. The wireless communication system may be the 4th generation mobile communication (4G) system, also known as the Long Term Evolution (LTE) system, or the wireless communication system may be the 5th generation mobile communication (5G) system, also known as the New Radio system or the 5G NR system. In one embodiment, the wireless communication system may be a next generation system of the 5G system. The access network in the 5G system may be referred to as New Generation-Radio Access Network (NG-RAN).

The base station 120 may be an evolved base station (eNB) as used in the 4G system. In one embodiment, the base station 120 may be a base station (gNB) with a centrally distributed architecture used in the 5G system. When the base station 120 adopts the centrally distributed architecture, it typically includes a central unit (CU) and at least two distributed units (DU). The central unit is provided with a protocol stack of Packet Data Convergence Protocol (PDCP) layer, Radio Link Control (RLC) layer and Media Access Control (MAC) layer, and the distributed unit is provided with a protocol stack of physical (PHY) layer. The specific implementation of the base station 120 is not limited in embodiments of the present disclosure.

A wireless connection may be established between the base station 120 and the user equipment 110 via a wireless radio. In various implementations, the wireless radio is a wireless radio based on the 4th generation mobile communication network technology (4G) standard, or the wireless radio is a wireless radio based on the 5th generation mobile communication network technology (5G) standard, for example, the wireless radio is the New Radio, or the wireless radio may also be a wireless radio based on the next generation mobile communication network technology standard of 5G.

In some embodiments, an end to end (E2E) connection may also be established between user equipments 110, examples of which include vehicle to vehicle (V2V) communication, vehicle to infrastructure (V2I) communication and vehicle to pedestrian (V2P) communication in the vehicle to everything (V2X) communication scenario.

Here, the above-mentioned user equipment may be considered as the terminal device in the following embodiments.

In some embodiments, the above wireless communication system may also include a network management device 130.

A number of base stations 120 are each connected to the network management device 130. The network management device 130 may be a core network device in the wireless communication system, for example, the network management device 130 may be a Mobility Management Entity (MME) in an Evolved Packet Core (EPC) network. In one embodiment, the network management device may be another core network device, such as a Serving GateWay (SGW), Public Data Network GateWay (PGW), Policy and Charging Rules Function (PCRF), Home Subscriber Server (HSS), or the like. The implementation of the network management device 130 is not limited in the embodiments of the present disclosure.

In order to better understand the technical solution described in any of the embodiments of the present disclosure, first, how the UE and the network (e.g., the core network) negotiate the supported capability is described partially.

The UE herein is a multi-card UE, and the multi-card UE has two or more SIMs.

In one embodiment, the capability supported by the UE includes, but is not limited to, the capability of at least one of paging cause, busy indication, filtering, and paging collision avoidance. In one embodiment, the busy indication capability may be considered as a paging rejection capability; the filtering capability may be considered as a paging time control capability; and the paging collision avoidance capability may be considered as a paging restriction capability. The capability supported by the multi-card UE herein may be considered as a multi-card capability supported.

In one embodiment, the multi-card UE reports the capabilities respectively using different negotiation mechanisms. For example, for the paging cause capability, the multi-card UE does not need to report that the multi-card UE supports the paging cause capability, but only needs to receive a notification message from the core network; and for the busy indication capability, filtering capability, paging collision avoidance capability or the like, the UE reports a plurality of identifiers to inform the core network of the plurality of capabilities supported by the multi-card UE.

In one embodiment, the multi-card UE reports the capabilities of the multi-card UE via a common identifier and receives capability information of all capabilities supported by the core network returned by the core network based on the common identifier. All the capabilities supported by the multi-card UE are indicated via the identifier. Herein the capability information returned by the core network to the multi-card UE includes information regarding the paging cause capability. However, when the multi-card UE does not support the paging cause capability, the core network also assumes that the UE supports the paging cause capability.

Therefore, in the above embodiment, when the UE reports the capability, it cannot accurately inform whether the UE supports the paging cause capability or not, so that the core network cannot know whether the UE supports the paging cause capability or not. In this manner, when the UE does not actually support the paging cause capability, the core network defaults that the UE supports the paging cause capability and thus sends information related to the paging cause to the UE, which may result in a significant waste of resources.

Figure 2:
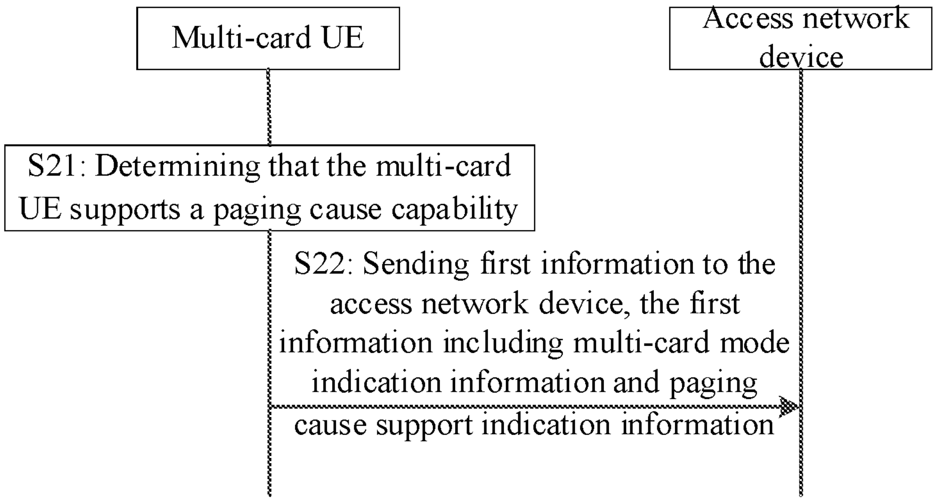
FIG. 2 is a flowchart of a method for processing information according to an exemplary embodiment of the present disclosure.

As shown in FIG. 2, an embodiment of the present disclosure provides a method for processing information performed by a multi-card UE, including:

step S21, determining that the multi-card UE supports a paging cause capability; and step S22, sending first information to an access network device, the first information including multi-card mode indication information and paging cause support indication information.

The multi-card mode indication information is configured to indicate that the multi-card UE has at least two SIMs in an operational state or that it needs to use a capability supported by the multi-card UE, and the paging cause support indication information is configured to indicate that the multi-card UE supports the paging cause capability.

In one embodiment, the multi-card UE may be various mobile terminals or fixed terminals. For example, the multi-card UE may be, but is not limited to, a mobile phone, a computer, a server, a wearable device, a game control platform, a multimedia device or the like, and it is only necessary that the multi-card UE satisfies the requirement of having two or more SIMs.

In one embodiment, the access network device may be an access network physical entity or an access network logical entity. In one embodiment, the access network device may refer to a network element of an access network. In one embodiment, the access network device may be a base station. The base station herein may be an interface device for the UE to access the Internet. The base station may be various types of base stations, for example, a 3G base station, a 4G base station, a 5G base station, or other evolved base stations.

In one embodiment, the multi-card mode indication information is configured to indicate that the multi-card UE has at least two SIMs in an operational state.

For example, the multi-card UE has SIM1 and SIM2, and both SIM1 and SIM2 are in the operational state. It may be, for example, that SIM1 is performing call services and SIM2 is performing internet services.

For example, the multi-card UE has SIM1, SIM2 and SIM3, and SIM1 and SIM2 are in the operational state, or SIM1, SIM2 and SIM3 are in the operational state.

In one embodiment, the multi-card mode indication information is configured to indicate that it needs to use the capability supported by the multi-card UE. The multi-card mode indication information herein may be configured to indicate that the multi-card UE is expected to use the capability supported by the multi-card UE.

For example, the multi-card UE has SIM1 and SIM2, and the multi-card UE is expected to use the capability of SIM1 and SIM2 in the operational state. For example, it may be that SIM1 has been registered to the core network, and SIM2 is ready to be registered to the core network.

In one embodiment, the multi-card mode indication information may be one bit or a plurality of bits. The plurality of bits herein may be 2 or more bits.

For example, when the multi-card mode indication information is 1 bit, such as "1", it may be considered to indicate that the multi-card UE has at least two SIMs in the operational state or that it needs to use the capability supported by the multi-card UE.

For example, the multi-card mode indication information may be 2 bits or 3 bits or 4 bits and so on. When the multi-card mode indication information is 2 bits, for example, when it is "11", it may be considered to indicate that the multi-card UE has at least two SIMs in the operational state or that it needs to use the capability supported by the multi-card UE.

In one embodiment, the paging cause support indication information may be one bit or a plurality of bits. The plurality of bits herein may be 2 or more bits.

In one embodiment, the paging cause support indication information may be an optional field of the first information.

For example, when the paging cause support indication information is one bit, such as "1", it may be considered to indicate that the multi-card UE supports the paging cause capability.

For example, the paging cause support indication information may be 2 bits or 3 bits or 4 bits and so on. When the paging cause identifier is 3 bits, for example, "111", it may be considered to indicate that the multi-card UE supports the paging cause capability.

In one embodiment, that the multi-card UE supports the paging cause capability includes that the multi-card UE to support the receiving capability of the paging cause.

In one embodiment, that the multi-card UE supports the paging cause capability includes that all SIMs in the multi-card UE support the paging cause capability. Of course, in other embodiments, that the multi-card UE supports the paging cause capability includes that at least one SIM in the multi-card UE supports the paging cause capability. In one embodiment, that the multi-card UE supports the paging cause capability includes that the SIM in the multi-card UE in the operational state supports the paging cause capability.

An embodiment of the present disclosure provides a method for processing information performed by a multi-card UE, which may include: determining that the multi-card UE supports a multi-card mode and a paging cause capability; and sending first information to an access network device, where the first information includes a multi-card mode indication information and a paging cause support indication information. Here, the multi-card UE supports the multi-card mode, i.e., the multi-card UE has two SIMs in an operating state or the multi-card UE needs to use the capability supported by the multi-card UE. In this way, in an embodiment of the present disclosure, the first information including multi-card mode indication information is sent only when it is determined that the multi-card UE supports the multi-card mode, and the paging cause support indication information is sent only when it is determined that the multi-card UE supports the paging cause capability.

In one embodiment, the multi-card UE sends the first information to the access network device, and the access network device forwards the first information to the core network device.

In one embodiment, the core network device may be a core network physical entity or a core network logical entity. In one embodiment, the core network device may refer to a network element of a core network. In one embodiment, the core network device may be an access and mobility management function network element (AMF).

An embodiment of the present disclosure provides a method for processing information performed by a multi-card UE, including: determining that the multi-card UE supports a paging cause capability; and sending the first information to a core network via an access network.

In the embodiments of the present disclosure, the multi-card UE determines that the multi-card UE supports the paging cause capability and sends the first information to the access network device, the first information includes the multi-card mode indication information and the paging cause support indication information, the multi-card mode indication information is configured to indicate that the multi-card UE has at least two SIMs in an operational state or that it needs to use the capability supported by the multi-card UE, and the paging cause support indication information is configured to indicate that the multi-card UE supports the paging cause capability. In this way, in the embodiments of the present disclosure, the UE may can report the paging cause support indication information indicating that the UE supports the paging cause capability, and thus the access network can accurately know whether the UE supports the paging cause capability, which is beneficial for the access network device to report the paging cause support indication information indicating that the UE supports the paging cause capability to the core network device, and thus the core network can accurately know whether the UE supports the paging cause capability. Therefore, in comparison with the related art in which both the core network and the access network default that the UE supports the paging cause capability and thus sends information related to the paging cause to the UE regardless of whether the UE supports the paging cause capability or not, the core network sends the information related to the paging cause to the UE only when the UE supports the paging cause capability, which can greatly reduce the waste of transmission resources and the like.

In some embodiments of the present disclosure, the multi-card mode indication information may be a multi-card mode identifier; the paging cause support indication information may be a paging cause support identifier; and multi-card capability indication information may be a multi-card capability identifier.

In one embodiment, the first information further includes one piece of multi-card capability indication information, and the multi-card capability indication information is configured to indicate a predetermined capability supported by the SIM, in the operational state, in the multi-card UE.

In one embodiment, the predetermined capability includes, but is not limited to, one of a paging rejection capability, a paging time control capability, and a paging restriction capability.

Of course, in other embodiments, the predetermined capability may refer to at least one capability other than the paging cause capability. The predetermined capability, for example, may also be other capabilities supported by the multi-card UE, which is not limited herein.

An embodiment of the present disclosure provides a method for processing information performed by a multi-card UE, which may include: determining that the multi-card UE supports a paging cause capability, and sending first information to an access network device. The first information includes multi-card mode indication information, paging cause support indication information, and one piece of multi-card capability indication information. The multi-card mode indication information is configured to indicate that the multi-card UE has at least two SIMs in an operational state or that it needs to use a capability supported by the multi-card UE, the paging cause support indication information is configured to indicate that the multi-card UE supports the paging cause capability, and the multi-card capability indication information is configured to indicate a predetermined capability supported by the SIM, in the operational state, in the multi-card UE.

In one embodiment, the multi-card capability indication information may be one bit or a plurality of bits. The plurality of bits herein may be 2 or more bits.

In this way, in an embodiment of the present disclosure, the multi-card UE may also report, through one piece of multi-card capability indication information, the capability supported by the SIM, in the operational state, in the multi-card UE. Therefore, the access network knows the capability supported by the multi-card UE. In this way, reporting resources for reporting the capability supported by the multi-card UE can be saved.

Of course, in other embodiments, the multi-card capability indication information is configured to indicate a predetermined capability supported by a plurality of SIMs in the multi-card UE. In this way, in an embodiment, the multi-card UE may also report, through the one piece of multi-card capability indication information, the capability supported by all the SIMs in the multi-card UE to the access network.

The predetermined capability may also be at least one capability other than the paging cause, therefore in an embodiment of the present disclosure, the multi-card UE can also report, through one piece of multi-card capability indication information, the capability, other than the paging cause capability, supported by the SIM in the operating state in the multi-card UE or by all the SIMs in the multi-card UE to the access network device.

In one embodiment, the first information further includes a plurality of pieces of multi-card capability indication information, and different multi-card capability indication information is configured to indicate a different predetermined capability supported by the SIM, in the operational state, in the multi-card UE.

An embodiment of the present disclosure provides a method for processing information performed by a multi-card UE, which may include: determining that the multi-card UE supports a paging cause capability, and sending first information to an access network device. The first information includes multi-card mode indication information, paging cause support indication information, and a plurality of pieces of multi-card capability indication information. The multi-card mode indication information is configured to indicate that the multi-card UE has at least two SIMs in an operational state or that it needs to use a capability supported by the multi-card UE, the paging cause support indication information is configured to indicate that the multi-card UE supports the paging cause capability, and different multi-card capability indication information is configured to indicate a different predetermined capability supported by the SIM, in the operational state, in the multi-card UE.

If the first information includes a plurality of pieces of multi-card capability indication information, one piece of multi-card capability indication information is configured to indicate one predetermined capability of the SIM in the operational state in the multi-card UE, in one embodiment, one piece of multi-card capability indication information is configured to indicate one predetermined capability of a plurality of SIMs in the multi-card UE.

In one embodiment, if the first information includes a plurality of pieces of multi-card capability indication information, the number of predetermined capabilities supported by the multi-card UE is the same as the number of the pieces of multi-card capability indication information.

For example, if the SIM in the operational state in the multi-card UE or a plurality of SIMs in the multi-card UE support three predetermined capabilities, there are three pieces of multi-card capability indication information. For example, if the predetermined capabilities supported by the multi-card UE are the capabilities of paging rejection, paging time control, and paging restriction, the multi-card capability indication information includes first multi-card capability indication information, second multi-card capability indication information, and third multi-card capability indication information, the first multi-card capability indication information is configured to indicate that the SIM in the operational state in the multi-card UE or the plurality of SIMs in the multi-card UE support the paging rejection capability, the second multi-card capability indication information is configured to indicate that the SIM in the operational state in the multi-card UE or the plurality of SIMs in the multi-card UE support the paging time control capability, and the third multi-card capability indication information is configured to indicate that the SIM in the operational state in the multi-card UE or the plurality of SIMs in the multi-card UE support the paging restriction capability.

In this way, in an embodiment of the present disclosure, the multi-card UE may also report, through a plurality of pieces of multi-card capability indication information, capabilities supported by the SIM in the operational state in the multi-card UE or the plurality of SIMs in the multi-card UE, and one piece of multi-card capability indication information indicates support of one predetermined capability, so that the access network device can know exactly which capability is supported by the multi-card UE through respective multi-card capability indication information.

In one embodiment, the multi-card capability indication information may also be an optional field of the first information. For example, the multi-card capability indication information may also be an optional field of a registration request message or an optional field of a service request message.

In one embodiment, the first information includes a registration request message or a service request message.

In one embodiment, if the registration request message includes the paging cause support indication information, the paging cause support indication information may be an optional field of the registration request message.

In one embodiment, if the service request message includes the paging cause support indication information, the paging cause support indication information may be an optional field of the service request message.

An embodiment of the present disclosure provides a method for processing information performed by a multi-card UE, which may include: determining that the multi-card UE supports a paging cause capability, and sending a registration request message to an access network device. The registration request message includes multi-card mode indication information and paging cause support indication information. The multi-card mode indication information is configured to indicate that the multi-card UE has at least two SIMs in an operational state or that it needs to use a capability supported by the multi-card UE, and the paging cause support indication information is configured to indicate that the multi-card UE supports the paging cause capability.

An embodiment of the present disclosure provides a method for processing information performed by a multi-card UE, which may include: determining that the multi-card UE supports a paging cause capability, and sending a registration request message to an access network device. The registration request message includes multi-card mode indication information, paging cause support indication information and one piece of multi-card capability indication information. The multi-card capability indication information is configured to indicate a predetermined capability supported by the SIM, in the operational state, in the multi-card UE.

An embodiment of the present disclosure provides a method for processing information performed by a multi-card UE, which may include: determining that the multi-card UE supports a paging cause capability, and sending a registration request message to an access network device. The registration request message includes multi-card mode indication information, paging cause support indication information and a plurality of pieces of multi-card capability indication information. Different multi-card capability indication information is configured to indicate a different predetermined capability supported by the SIM, in the operational state, in the multi-card UE.

In this way, in an embodiment of the present disclosure, when the multi-card UE needs to be registered to the core network, the multi-card mode indication information indicating that the multi-card UE supports the multi-card mode and the paging cause support indication information indicating that the multi-card UE supports the paging cause capability may be included in the registration request message to be sent to the access network device of the access network, or the multi-card mode indication information indicating that the multi-card UE supports the multi-card mode, the paging cause support indication information indicating that the multi-card UE supports the paging cause capability and multi-card capability indication information indicating that the multi-card UE supports another capability may be included in the registration request message to be sent to the access network device, so that the access network can accurately know whether or not the multi-card UE is in the multi-card mode and whether or not it supports the paging cause capability and the like. Moreover, since the multi-card mode indication information, the paging cause support indication information, the multi-card capability indication information and the like are carried by the registration request message and reported to the access network, there is no need to send additional information to carry the same to be reported to the network, which thus can save transmission resources and power consumption of the communication device.

An embodiment of the present disclosure provides a method for processing information performed by a multi-card UE, which may include: determining that the multi-card UE supports a paging cause capability, and sending a service request message to an access network device. The service request message includes multi-card mode indication information and paging cause support indication information. The multi-card mode indication information is configured to indicate that the multi-card UE has at least two SIMs in an operational state or that it needs to use a capability supported by the multi-card UE, and the paging cause support indication information is configured to indicate that the multi-card UE supports the paging cause capability.

An embodiment of the present disclosure provides a method for processing information performed by a multi-card UE, which may include: determining that the multi-card UE supports a paging cause capability, and sending a service request message to an access network device. The registration request message includes multi-card mode indication information, paging cause support indication information and one piece of multi-card capability indication information. The multi-card capability indication information is configured to indicate a predetermined capability supported by the SIM, in the operational state, in the multi-card UE.

An embodiment of the present disclosure provides a method for processing information performed by a multi-card UE, which may include: determining that the multi-card UE supports a paging cause capability, and sending a service request message. The registration request message includes multi-card mode indication information, paging cause support indication information and a plurality of pieces of multi-card capability indication information. Different multi-card capability indication information is configured to indicate a different predetermined capability supported by the SIM, in the operational state, in the multi-card UE.

In this way, in an embodiment of the present disclosure, when the multi-card UE needs to perform a service request, the multi-card mode indication information indicating that the multi-card UE supports the multi-card mode and the paging cause support indication information indicating that the multi-card UE supports the paging cause capability may be included in the service request message to be sent to the access network device of the access network, or the multi-card mode indication information indicating that the multi-card UE supports the multi-card mode, the paging cause support indication information indicating that the multi-card UE supports the paging cause capability and multi-card capability indication information indicating that the multi-card UE supports another capability may be included in the service request message to be sent to the access network device, so that the access network can accurately know whether or not the multi-card UE is in the multi-card mode and whether or not it supports the paging cause capability and the like. Moreover, since the multi-card mode indication information, the paging cause support indication information, the multi-card capability indication information and the like are carried by the service request message and reported to the access network, there is no need to send additional information to carry the same to be reported to the network, which thus can save transmission resources and power consumption of the communication device.

In one embodiment, the multi-card UE sends the registration request message to the access network device, and the access network device sends the registration request message to the core network device.

In one embodiment, the multi-card UE sends the service request message to the access network device, and the access network device sends the service request message to the core device.

In an embodiment of the present disclosure, the multi-card mode indication information, the paging cause support indication information, and/or the multi-card capability indication information may be sent when the multi-card UE initiates a registration request or a service request, so that the access network can accurately know whether the multi-card UE is in a multi-card mode and whether it supports capabilities such as paging causes. Moreover, the information such as the multi-card mode indication information, the paging cause support indication information and/or the multi-card capability indication information may be forwarded to the core network device via the access network device of the access network, and thus the core network can accurately know whether the multi-card UE is in the multi-card mode and whether it supports the capability such as paging cause. In this way, it is beneficial for the core network device of the core network to send the corresponding information to the multi-card UE, which is in favor of the service completion and the successful registration of the multi-card UE.

The methods provided in the embodiments of the present disclosure may be executed alone or together with some of the methods in the embodiments of the present disclosure or some of the methods in the related art.

Figure 3:
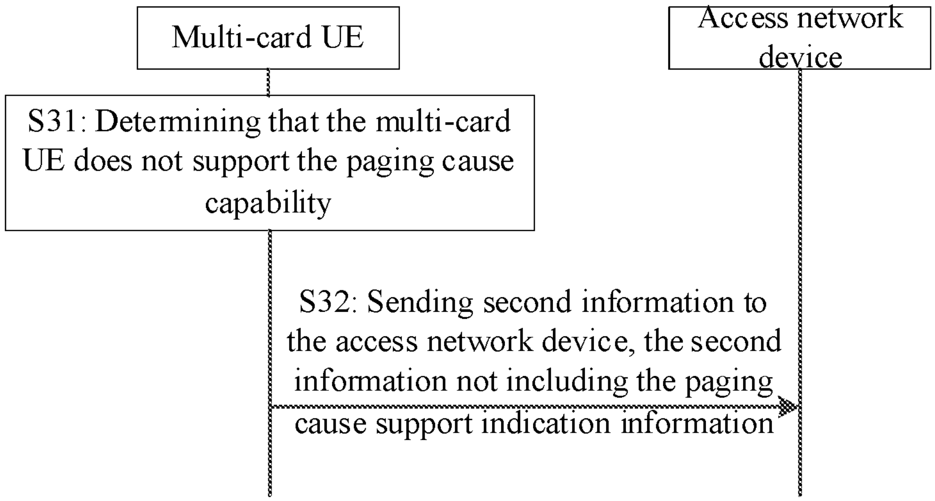
FIG. 3 is a flowchart of a method for processing information according to an exemplary embodiment of the present disclosure.

As shown in FIG. 3, an embodiment of the present disclosure provides a method for processing information performed by a multi-card UE, including:

- step S31, determining that the multi-card UE does not support the paging cause capability; and
- step S32, sending second information to the access network device, the second information not including the paging cause support indication information.

In one embodiment, in comparison with the first information, the second information does not include the paging cause support indication information.

In some embodiments of the present disclosure, the multi-card UE is the multi-card UE as described in step S21; the paging cause capability is the paging cause capability as described in step S21; and the first information may be the first information in step S21.

In one embodiment, in comparison with the first information, the second information only does not include the paging cause support indication information.

For example, the second information includes the multi-card mode indication information, and the multi-card mode indication information is the multi-card mode indication information in step S21.

For example, the second information includes one piece of multi-card capability indication information or a plurality of pieces of multi-card capability indication information, and the multi-card capability indication information is the multi-card capability indication information in step S21.

In an embodiment of the present disclosure, the multi-card UE may report the second information not including the paging cause support indication information, so that the access network can accurately know that the multi-card UE does not support the paging cause capability, and thus when the access network forwards the second information to the core network, the core network does not send the information related to that the UE supports the paging cause capability. In this way, transmission resources and the like can be greatly saved.

In one embodiment, the second information includes a registration request message or a service request message.

An embodiment of the present disclosure provides a method for processing information performed by a multi-card UE, which may include: determining that the multi-card UE does not support a paging cause capability, and sending a registration request message to an access network device. The registration request message includes multi-card mode indication information. The multi-card mode indication information is configured to indicate that the multi-card UE has at least two SIMs in an operational state or that it needs to use a capability supported by the multi-card UE.

An embodiment of the present disclosure provides a method for processing information performed by a multi-card UE, which may include: determining that the multi-card UE does not support a paging cause capability, and sending a registration request message to an access network device. The registration request message includes multi-card mode indication information, and one piece of multi-card capability indication information. The multi-card capability indication information is configured to indicate a predetermined capability supported by the SIM, in the operational state, in the multi-card UE.

An embodiment of the present disclosure provides a method for processing information performed by a multi-card UE, which may include: determining that the multi-card UE does not support a paging cause capability, and sending a registration request message to an access network device. The registration request message includes multi-card mode indication information, and a plurality of pieces of multi-card capability indication information. Different multi-card capability indication information is configured to indicate a different predetermined capability supported by the SIM, in the operational state, in the multi-card UE.

In this way, in an embodiment of the present disclosure, when the multi-card UE needs to be registered to the core network, the multi-card mode indication information indicating that the multi-card UE supports the multi-card mode may be included in the registration request message to be sent to the access network device of the access network, or the multi-card mode indication information indicating that the multi-card UE supports the multi-card mode and the multi-card capability indication information indicating that the multi-card UE supports another capability may be included in the registration request message to be sent to the access network device, so that the access network can accurately know whether or not the multi-card UE is in the multi-card mode and whether or not it supports a capability other than the paging cause capability. Moreover, since the registration request message does not include the paging cause support indication information, the access network can accurately know that the multi-card UE does not support the paging cause capability. Further, since the multi-card mode indication information, the multi-card capability indication information and the like are carried by the registration request message and reported to the access network, there is no need to send additional information to carry the same to be reported to the access network, which thus can save transmission resources and power consumption of the communication device.

An embodiment of the present disclosure provides a method for processing information performed by a multi-card UE, which may include: determining that the multi-card UE does not support a paging cause capability, and sending a service request message to an access network device. The service request message includes multi-card mode indication information. The multi-card mode indication information is configured to indicate that the multi-card UE has at least two SIMs in an operational state or that it needs to use a capability supported by the multi-card UE.

An embodiment of the present disclosure provides a method for processing information performed by a multi-card UE, which may include: determining that the multi-card UE does not support a paging cause capability, and sending a service request message to an access network device. The registration request message includes multi-card mode indication information and one piece of multi-card capability indication information. The multi-card capability indication information is configured to indicate a predetermined capability supported by the SIM, in the operational state, in the multi-card UE.

An embodiment of the present disclosure provides a method for processing information performed by a multi-card UE, which may include: determining that the multi-card UE does not support a paging cause capability, and sending a service request message to an access network device. The registration request message includes multi-card mode indication information and a plurality of pieces of multi-card capability indication information. Different multi-card capability indication information is configured to indicate a different predetermined capability supported by the SIM, in the operational state, in the multi-card UE.

In this way, in an embodiment of the present disclosure, when the multi-card UE needs to perform service request, the multi-card mode indication information indicating that the multi-card UE supports the multi-card mode may be included in the service request message to be sent to the access network device of the access network, or the multi-card mode indication information indicating that the multi-card UE supports the multi-card mode and the multi-card capability indication information indicating that the multi-card UE supports another capability may be included in the service request message to be sent to the access network device, so that the access network can accurately know whether or not the multi-card UE is in the multi-card mode and whether or not it supports a capability other than the paging cause capability. Moreover, since the service request message does not include the paging cause support indication information, the access network can accurately know that the multi-card UE does not support the paging cause capability. Further, since the multi-card mode indication information, the multi-card capability indication information and the like are carried by the service request message and reported to the access network device, there is no need to send additional information to carry the same to be reported to the access network device, which thus can save transmission resources and power consumption of the communication device.

In one embodiment, the multi-card UE sends the registration request message to the access network device, and the access network device sends the registration request message to the core network device.

In one embodiment, the multi-card UE sends the service request message to the access network device, and the access network device sends the service request message to the core device.

In an embodiment of the present disclosure, the multi-card mode indication information and/or the multi-card capability indication information may be sent when the multi-card UE initiates a registration request or a service request, so that the access network can accurately know whether the multi-card UE is in a multi-card mode, that the multi-card UE does not support the paging cause capability and whether it supports capabilities other than the paging cause capability. Moreover, the information such as the multi-card mode indication information and/or the multi-card capability indication information may be forwarded to the core network device via the access network device of the access network, and thus the core network can accurately know whether the multi-card UE is in the multi-card mode and whether it supports the capability other than the paging cause capability. In this way, it is beneficial for the core network device of the core network to send the corresponding information to the multi-card UE, which is in favor of the service completion and the successful registration of the multi-card UE.

An embodiment of the present disclosure provides a method for processing information performed by a multi-card UE, including: determining that the multi-card UE does not support the paging cause capability; and sending the second information to the core network via the access network.

In an embodiment of the present disclosure, the multi-card UE may forward the second information to the core network via the access network, and thus the second information may be accurately delivered to the core network.

The methods provided in the embodiments of the present disclosure may be performed alone or together with some of the methods in the embodiments of the present disclosure or some of the methods in the related art.

Figure 4:
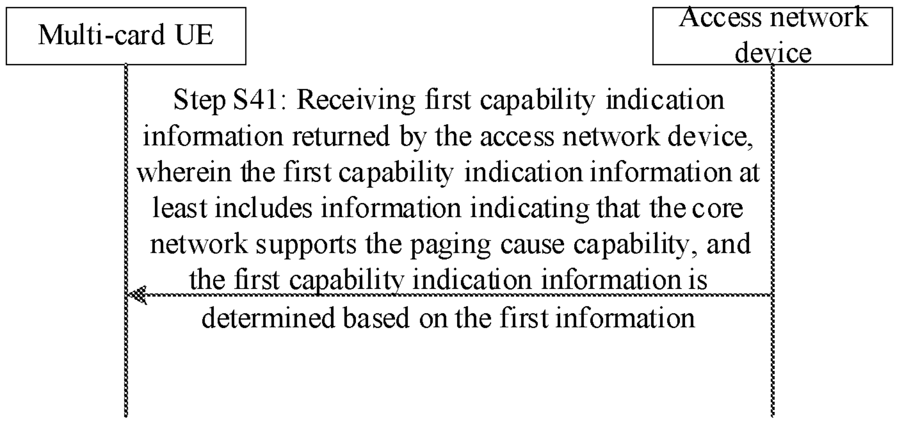
FIG. 4 is a flowchart of a method for processing information according to an exemplary embodiment of the present disclosure.

As shown in FIG. 4, an embodiment of the present disclosure provides a method for processing information performed by a multi-card UE, including:

step S41, receiving first capability indication information returned by the access network device, wherein the first capability indication information at least includes information indicating that the core network supports the paging cause capability, and the first capability indication information is determined based on the first information.

In some embodiments of the present disclosure, the multi-card UE is the multi-card UE as described in step S21; the first information is the first information as described in step S21; the paging cause capability is the paging cause capability as described in step S21; the core network device is the core network device as described in step S21; and the access network device is the access network device as described in step S21.

In one embodiment, the information that the core network supports the paging cause capability includes information that the core network supports the sending of the paging cause.

In one embodiment, step S41 includes: receiving the first capability indication information sent by the core network device and forwarded by the access network device. For example, the access network receives the first capability indication information sent by the core network, and the core network sends the first capability indication information to the multi-card UE.

In an embodiment of the present disclosure, the multi-card UE receives the first capability indication information sent by the core network device and forwarded by the access network device, so that the multi-card UE can know that the core network supports the sending capability of the paging cause, which helps the multi-card UE to accurately receive the information related to the paging cause subsequently.

In an embodiment, the first capability indication information may also include information indicating that the core network supports the capability of paging rejection, paging time control, and/or paging restriction. In this way, in an embodiment of the present disclosure, the multi-card UE receives the first capability indication information sent by the core network, so that the multi-card UE can accurately know whether or not the core network supports the capability of paging rejection, paging time control, and/or paging restriction. Of course, in other embodiments, the first capability indication information may also refer to other capabilities supported by the core network, which is not limited herein.

An embodiment of the present disclosure provides a method for processing information performed by a multi-card UE, including: receiving second capability indication information returned by the access network device, wherein the second capability indication information does not include information indicating support of the paging cause capability, and the second capability indication information is determined by the core network device based on the second information.

An embodiment of the present disclosure provides a method for processing information performed by a multi-card UE, including: receiving second capability indication information sent by the core network device and forwarded by the access network device, wherein the second capability indication information does not include information indicating that the core network supports the paging cause capability, and the second capability indication information is determined by the core network device based on the second information.

In one embodiment, in comparison with the first capability indication information, the second capability indication information herein does not include information indicating that the core network supports the paging cause capability.

Thus, in an embodiment of the present disclosure, when the multi-card UE receives the second capability indication information not including information indicating that the core network supports the paging cause capability, the multi-card UE can accurately know that the core network does not support the sending of the paging cause. In this way, the multi-card UE may not monitor the information related to the paging cause, which thus can save transmission resources and power consumption of the UE.

The methods provided in the embodiments of the present disclosure may be executed alone or together with some of the methods in the embodiments of the present disclosure or some of the methods in the related art.

A method for processing information is described below, which is applied to an access network device, and is described similar to the description of the method for processing information applied to the multi-card UE as described above; and as for the technical details not disclosed in the embodiments of the method for processing information applied to the access network device, please refer to the description of the example method for processing information applied to the multi-card UE, which will not be described and illustrated in detail herein.

Figure 5:
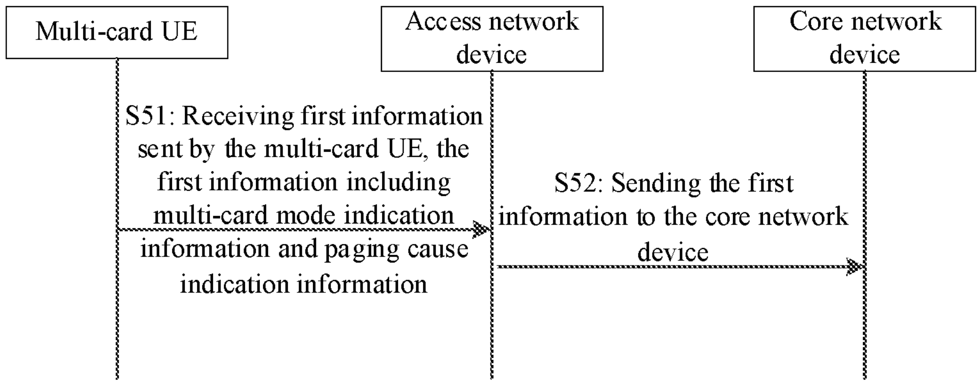
FIG. 5 is a flowchart of a method for processing information according to an exemplary embodiment of the present disclosure.

As shown in FIG. 5, an embodiment of the present disclosure provides a method for processing information performed by an access network device, including:

step S51, receiving first information sent by a multi-card UE, the first information including multi-card mode indication information and paging cause indication information, wherein the multi-card mode indication information is configured to indicate that the multi-card UE has at least two SIMs in an operational state or that it needs to use a capability supported by the multi-card UE, and the paging cause support indication information is configured to indicate that the multi-card UE supports the paging cause capability; and step S52, sending the first information to a core network device.

In this way, in an embodiment of the present disclosure, the first information of the multi-card UE may be forwarded to the core network device through the access network device, so that the core network device can accurately know that the multi-card UE supports the paging cause capability. Therefore, in comparison with the related art in which the core network defaults that the UE supports the paging cause capability and thus sends information related to the paging cause to the UE regardless of whether the UE supports the paging cause capability or not, the core network sends the information related to the paging cause to the UE only when the UE supports the paging cause capability, which can greatly reduce the waste of transmission resources and the like.

An embodiment of the present disclosure provides a method for processing information performed by an access network device, which may include: receiving second information sent by a multi-card UE, the second information not including the paging cause support indication information; and sending the second information to a core network device.

In this way, in an embodiment of the present disclosure, the second information can be forwarded to the core network device by the access network device, so that the core network device can accurately know the multi-card UE does not support the paging cause capability, and thus the core network would not send the information related to support of the paging cause capability to the UE. In this way, transmission resources and the like can be greatly saved.

In one embodiment, the first information further includes one piece of multi-card capability indication information, and the multi-card capability indication information is configured to indicate a predetermined capability supported by the SIM, in the operational state, in the multi-card UE.

In one embodiment, the first information further includes a plurality of pieces of multi-card capability indication information, and different multi-card capability indication information is configured to indicate a different predetermined capability supported by the SIM, in the operational state, in the multi-card UE.

In one embodiment, the predetermined capability includes at least one of: a paging rejection capability; a paging time control capability; and a paging restriction capability.

Of course, in other embodiments, the predetermined capability may refer to at least one capability other than the paging cause capability.

In one embodiment, the first information further includes a registration request message or a service request message.

An embodiment of the present disclosure provides a method for processing information performed by an access network device, including:

receiving a registration request message sent by a multi-card UE, the registration request message including multi-card mode indication information and paging cause support indication information, wherein the multi-card mode indication information is configured to indicate that the multi-card UE has at least two SIMs in an operational state or that it needs to use a capability supported by the multi-card UE, and the paging cause support indication information is configured to indicate that the multi-card UE supports the paging cause capability; and sending the registration request message to a core network device.

An embodiment of the present disclosure provides a method for processing information performed by an access network device, including:

receiving a registration request message sent by a multi-card UE, the registration request message including multi-card mode indication information, paging cause support indication information, and one piece of multi-card capability indication information, wherein the multi-card capability indication information is configured to indicate a predetermined capability supported by the SIM, in the operational state, in the multi-card UE; and sending the registration request message to a core network device.

An embodiment of the present disclosure provides a method for processing information performed by an access network device, including:

receiving a registration request message sent by a multi-card UE, the registration request message including multi-card mode indication information, paging cause support indication information, and a plurality of pieces of multi-card capability indication information, wherein different multi-card capability indication information is configured to indicate a different predetermined capability supported by the SIM, in the operational state, in the multi-card UE; and sending the registration request message to a core network device.

An embodiment of the present disclosure provides a method for processing information performed by an access network device, including:

receiving a service request message sent by a multi-card UE, the service request message including multi-card mode indication information and paging cause support indication information, wherein the multi-card mode indication information is configured to indicate that the multi-card UE has at least two SIMs in an operational state or that it needs to use a capability supported by the multi-card UE, and the paging cause support indication information is configured to indicate that the multi-card UE supports the paging cause capability; and sending the service request message to a core network device.

An embodiment of the present disclosure provides a method for processing information performed by an access network device, including:

receiving a service request message sent by a multi-card UE, the service request message including multi-card mode indication information, paging cause indication information, and one piece of multi-card capability indication information, wherein the multi-card capability indication information is configured to indicate a predetermined capability supported by the SIM, in the operational state, in the multi-card UE; and sending the service request message to a core network device.

An embodiment of the present disclosure provides a method for processing information performed by an access network device, including:

receiving a service request message sent by a multi-card UE, the service request message including multi-card mode indication information, paging cause indication information, and a plurality of pieces of multi-card capability indication information, wherein different multi-card capability indication information is configured to indicate a different predetermined capability supported by the SIM, in the operational state, in the multi-card UE; and sending the service request message to a core network device.

In this way, in an embodiment of the present disclosure, the access network device may forward the registration request message or the service request message including the multi-card mode indication information, the paging cause support indication information and/or the multi-card capability indication information to the core network device, so that the core network can accurately know whether the multi-card UE is in the multi-card mode or not and whether it supports capabilities such as paging cause and so on, and at the same time, the registration and service processing of the multi-card UE are realized, therefore transmission resources can be saved.

An embodiment of the present disclosure provides a method for processing information performed by an access network device, which may include:

receiving first capability indication information returned by the core network device based on the first information, wherein the first capability indication information at least includes information indicating that the core network supports the paging cause capability; and sending the first capability indication information to the multi-card UE.

In this way, in an embodiment of the present disclosure, the first capability indication information can be forwarded to the multi-card UE by the access network device, so that the multi-card UE can know the capability of the core network supporting the sending of the paging cause; in this way, which helps the multi-card UE to accurately receive the information related to the paging cause subsequently.

The methods provided in the embodiments of the present disclosure may be executed alone or together with some of the methods in the embodiments of the present disclosure or some of the methods in the related art.

A method for processing information is described below, which is applied to a core network device, and is described similar to the description of the method for processing information applied to the multi-card UE as described above; and as for the technical details not disclosed in the embodiments of the method for processing information applied to the core network device, please refer to the description of the example method for processing information applied to the multi-card UE, which will not be described and illustrated in detail herein.

Figure 6:
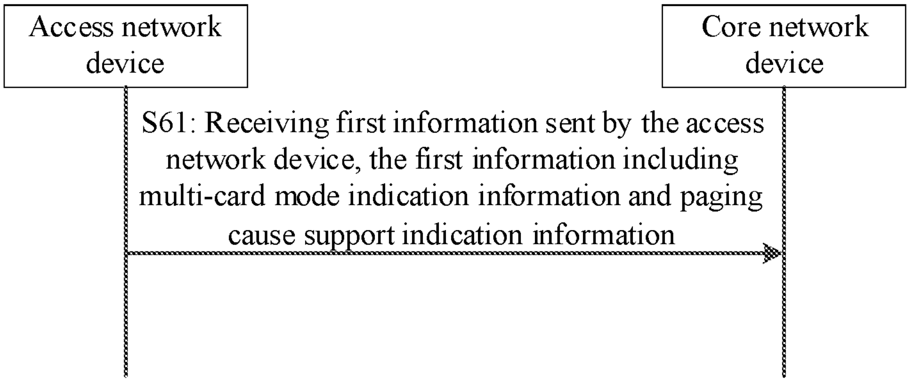
FIG. 6 is a flowchart of a method for processing information according to an exemplary embodiment of the present disclosure.

As shown in FIG. 6, an embodiment of the present disclosure provides a method for processing information performed by a core network device, including:

step S61, receiving first information sent by an access network device, the first information including multi-card mode indication information and paging cause support indication information.

The multi-card mode indication information is configured to indicate that a multi-card UE has at least two SIMs in an operational state or that it needs to use a capability supported by the multi-card UE, and the paging cause support indication information is configured to indicate that the multi-card UE supports the paging cause capability.

In this way, in an embodiment of the present disclosure, the core network device may receive the first information of the multi-card UE forwarded by the access network device, so that the core network device can accurately know that the multi-card UE supports the paging cause capability. Therefore, in comparison with the related art in which the core network defaults that the UE supports the paging cause capability and thus sends information related to the paging cause to the UE regardless of whether the UE supports the paging cause capability or not, the core network sends the information related to the paging cause to the UE only when the UE supports the paging cause capability, which can greatly reduce the waste of transmission resources and the like.

In one embodiment, the first information includes one piece of multi-card capability indication information, and the multi-card capability indication information is configured to indicate a predetermined capability supported by the SIM, in the operational state, in the multi-card UE.

In one embodiment, the first information includes a plurality of pieces of multi-card capability indication information, and different multi-card capability indication information is configured to indicate a different predetermined capability supported by the SIM, in the operational state, in the multi-card UE.

An embodiment of the present disclosure provides a method for processing information performed by a core network device, which may include: receiving first information sent by an access network device, the first information including multi-card mode indication information, paging cause support indication information, and one piece of multi-card capability indication information, wherein the multi-card capability indication information is configured to indicate a predetermined capability supported by the SIM, in the operational state, in the multi-card UE.

An embodiment of the present disclosure provides a method for processing information performed by a core network device, which may include: receiving first information sent by an access network device, the first information including multi-card mode indication information, paging cause support indication information, and a plurality of pieces of multi-card capability indication information, wherein different multi-card capability indication information is configured to indicate a different predetermined capability supported by the SIM, in the operational state, in the multi-card UE.

In an embodiment, the first information includes a registration request message or a service request message.

An embodiment of the present disclosure provides a method for processing information performed by a core network device, which may include: receiving a registration request message sent by an access network device, the registration request message including multi-card mode indication information and paging cause support indication information.

An embodiment of the present disclosure provides a method for processing information performed by a core network device, which may include: receiving a registration request message sent by an access network device, the registration request message including multi-card mode indication information, paging cause support indication information, and one piece of multi-card capability indication information.

An embodiment of the present disclosure provides a method for processing information performed by a core network device, which may include: receiving a registration request message sent by an access network device, the registration request message including multi-card mode indication information, paging cause support indication information, and a plurality of pieces of multi-card capability indication information.

An embodiment of the present disclosure provides a method for processing information performed by a core network device, which may include: receiving a service request message sent by the access network device, the service request message including multi-card mode indication information and paging cause support indication information.

An embodiment of the present disclosure provides a method for processing information performed by a core network device, which may include: receiving a service request message sent by an access network device, the service request message including multi-card mode indication information, paging cause support indication information, and one piece of multi-card capability indication information.

An embodiment of the present disclosure provides a method for processing information performed by a core network device, which may include: receiving a service request message sent by an access network device, the service request message including multi-card mode indication information, paging cause support indication information, and a plurality of pieces of multi-card capability indication information.

An embodiment of the present disclosure provides a method for processing information performed by a core network device, which may include: receiving second information sent by the access network device, the second information not including the paging cause support indication information.

In one embodiment, in comparison with the first information, the second information does not include the paging cause support indication information.

An embodiment of the present disclosure provides a method for processing information performed by a core network device, which may include: receiving second information sent by an access network device, the second information including multi-card mode indication information.

An embodiment of the present disclosure provides a method for processing information performed by a core network device, which may include: receiving second information sent by an access network device, the second information including multi-card mode indication information and one piece of multi-card capability indication information.

An embodiment of the present disclosure provides a method for processing information performed by a core network device, which may include: receiving second information sent by an access network device, the second information including multi-card mode indication information and a plurality of pieces of multi-card capability indication information.

In one embodiment, the second information includes a registration request message or a service request message.

An embodiment of the present disclosure provides a method for processing information performed by a core network device, which may include: receiving a registration request message sent by an access network device, the registration request message including the multi-card mode indication information.

An embodiment of the present disclosure provides a method for processing information performed by a core network device, which may include: receiving a registration request message sent by an access network device, the registration request message including multi-card mode indication information, and one piece of multi-card capability indication information.

An embodiment of the present disclosure provides a method for processing information performed by a core network device, which may include: receiving a registration request message sent by an access network device, the registration request message including multi-card mode indication information, and a plurality of pieces of multi-card capability indication information.

An embodiment of the present disclosure provides a method for processing information performed by a core network device, which may include: receiving a service request message sent by an access network device, the service request message including multi-card mode indication information.

An embodiment of the present disclosure provides a method for processing information performed by a core network device, which may include: receiving a service request message sent by an access network device, the service request message including multi-card mode indication information, and one piece of multi-card capability indication information.

An embodiment of the present disclosure provides a method for processing information performed by a core network device, which may include: receiving a service request message sent by an access network device, the service request message including multi-card mode indication information, and a plurality of pieces of multi-card capability indication information.

The methods provided in the embodiments of the present disclosure may be executed alone or together with some of the methods in the embodiments of the present disclosure or some of the methods in the related art.

Figure 7:
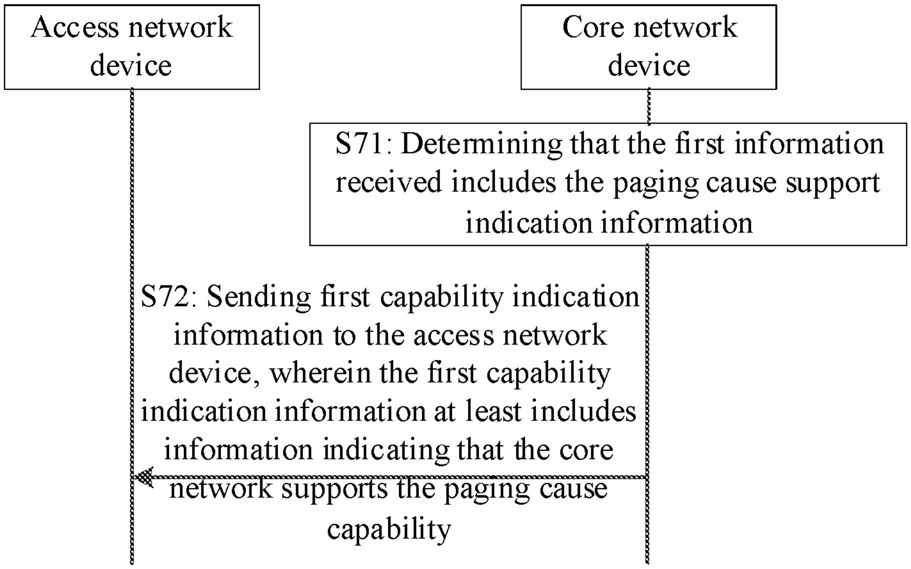
FIG. 7 is a flowchart of a method for processing information according to an exemplary embodiment of the present disclosure.

As shown in FIG. 7, a method for processing information is provided, which is performed by a core network device and includes:

step S71, determining that the first information received includes the paging cause support indication information; and step S72, sending first capability indication information to the access network device, wherein the first capability indication information at least includes information indicating that the core network supports the paging cause capability.

In other embodiments, the first capability indication may also at least include information indicating whether the core network supports the paging cause capability or not.

An embodiment of the present disclosure provides a method for processing information performed by a core network device, including: determining that the second information received does not include the paging cause support indication information; and sending second capability indication information to the access network device, the second capability indication information not including information indicating that the core network supports the paging cause capability.

In one embodiment, the first capability indication information includes information indicating that the core network supports the capability of the paging rejection, the paging time control, and/or the paging restriction.

In one embodiment, the second capability indication information includes information indicating that the core network supports the capability of the paging rejection, the paging time control, and/or the paging restriction.

An embodiment of the present disclosure provides a method for processing information performed by a core network device, including: determining that the first information received includes the paging cause support indication information, and sending the first capability indication information to the multi-card UE via the access network device.

In one embodiment, sending the first capability indication information in step S71 includes: sending the first capability indication information to the UE via the access network.

In this way, in an embodiment of the present disclosure, the core network device may forward the first capability indication information to the multi-card UE through the access network device, so that the multi-card UE can know that the core network supports the sending capability of the paging cause, which helps the multi-card UE to accurately receive the information related to the paging cause subsequently.

An embodiment of the present disclosure provides a method for processing information performed by a core network device, including: determining that the second information received does not include the paging cause support indication information; and sending the second capability indication information to the access network device.

An embodiment of the present disclosure provides a method for processing information performed by a core network device, including: determining that the second information received does not include the paging cause support indication information; and sending the second capability indication information to the multi-card UE via the access network device.

An embodiment of the present disclosure provides a method for processing information performed by a core network device, including: determining the first capability indication information based on the first information and the capability supported by the core network.

For example, the core network device receives the first information, determines that the first information includes the paging cause support indication information, and then determines that the multi-card UE supports the receiving of the paging cause. If the core network device determines that the core network device itself also supports the sending of the paging cause, the core network device sends, to the multi-card UE, the first capability indication information indicating that the core network supports the paging cause capability. If the core network device determines that the core network device itself does not support the sending of the paging cause, the core network device does not send the first capability indication information to the access network device, or sends, to the access network device, the first capability indication information indicating that the core network does not support the paging cause capability.

For example, the core network device receives the first information, determines that the first information includes one piece of multi-card capability indication information which indicating that the multi-card UE supports the capability of paging rejection, paging time control, and paging restriction, and then determines that the multi-card UE supports the receiving of the paging rejection, the receiving of the paging time control, and the receiving of the paging restriction. If the core network device determines that the core network device itself also supports the sending of the paging rejection, the sending of the paging time control, and the sending of the paging restriction, the core network device sends, to the multi-card UE, the first capability indication information that indicates the core network device supports the paging rejection capability, the paging time control capability, and the paging restriction capability. If the core network device determines that the core network device itself supports the sending of the paging rejection, but does not support the sending of the paging time control and the sending of the paging restriction, the core network device sends, to the access network device, the first capability indication information indicating that the core network supports the paging rejection capability but does not support the paging time control capability and the paging restriction capability, or sends, to the access network device, the first capability indication information indicating that the core network supports the paging rejection capability.

The present disclosure provides a method for processing information performed by a core network device, including: determining the second capability indication information based on the second information and the capability supported by the core network.

For example, the core network device receives the second information and determines that the second information does not include the paging cause support indication information, and then determines that the multi-card UE does not support the receiving of the paging cause. Then the core network device does not feed any information back to the access network device or sends, to the access network device, the second capability indication information indicating that the core network does not support the paging cause capability.

In an embodiment of the present disclosure, the core network device may accurately determine, based on the first information and the capabilities supported by the core network itself, the first capability indication information indicating whether or not the core network supports the paging cause capability and/or whether or not the core network supports the capability other than the paging cause capability. Therefore, when the access network device sends the first capability indication information to the multi-card UE, the multi-card UE can accurately know the capabilities supported by the core network after receiving the first capability indication information.

In one embodiment, the core network device may accurately determine, based on the first information and the capabilities supported by the core network itself, the second capability indication information indicating that the core network does not support the paging cause capability and/or whether or not the core network supports the capability other than the paging cause capability. Therefore, when the access network device sends the second capability indication information to the multi-card UE, the multi-card UE can accurately know the capabilities supported by the core network other than the paging cause capability after receiving the second capability indication information.

The methods provided in the embodiments of the present disclosure may be executed alone or together with some of the methods in the embodiments of the present disclosure or some of the methods in the related art.

To further explain embodiments of the present disclosure, a specific example is provided below.

Figure 8:
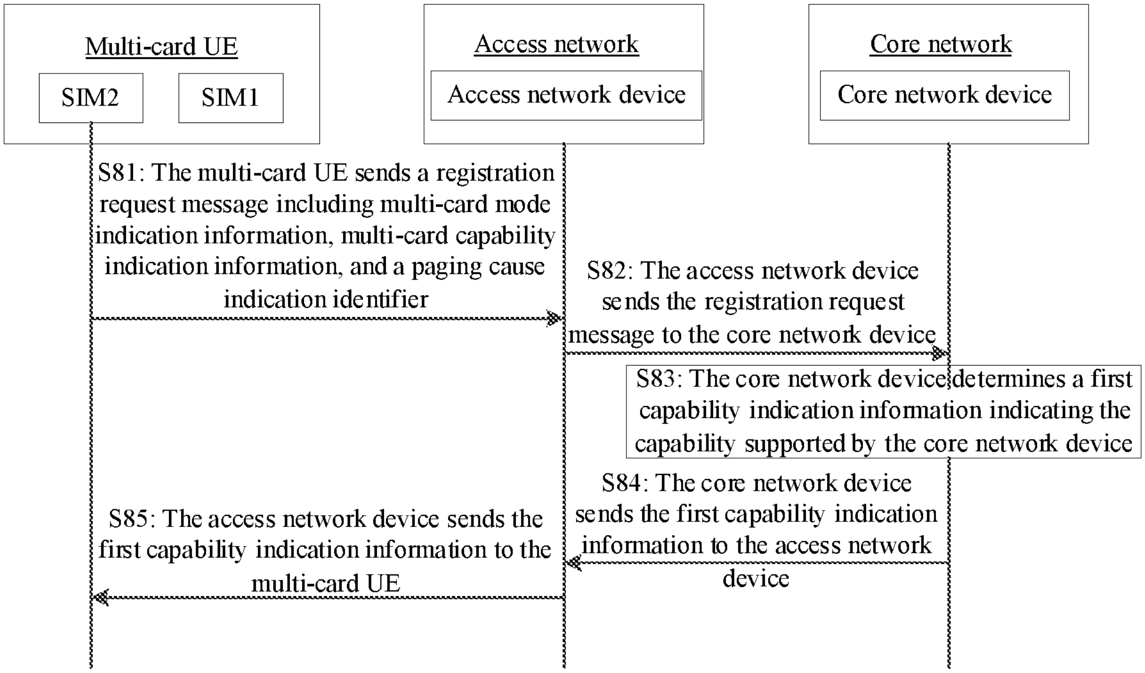
FIG. 8 is a flowchart of a method for processing information according to an exemplary embodiment of the present disclosure.

As shown in FIG. 8, a method for processing information is provided, which includes the following steps S81 to S85.

In step S81, the multi-card UE sends a registration request message, and the registration request message includes multi-card mode indication information, multi-card capability indication information, and a paging cause indication identifier.

The multi-card UE herein includes a first SIM and a second SIM. In one embodiment, the first SIM is SIM1, and the second SIM is SIM2.

In one optional embodiment, the multi-card UE determines that the multi-card UE has the first SIM and second SIM in an operational state and that the multi-card UE supports the paging cause capability. The multi-card UE sends the registration request message by using the second SIM. The registration request message includes multi-card mode indication information, multi-card capability indication information, and paging cause support indication information, the multi-card mode indication information is configured to indicate that the multi-card UE has at least two SIMs in an operational state, or to indicate that it needs to use a capability supported by the multi-card UE, the paging cause support indication information is configured to indicate that the multi-card UE supports the paging cause capability, and the multi-card capability indication information is configured to indicate that the SIM in the operational state in the multi-card UE supports the capability of paging rejection, paging time control, and paging restriction.

Of course, in other embodiments, if the multi-card UE determines that only one SIM in the multi-card UE is in the operational state and determines that it does not need to use the capability supported by the multi-card UE, the registration request message sent does not include the multi-card mode indication information.

Of course, in other embodiments, if the multi-card UE determines that the multi-card UE does not support the paging cause capability, the registration request message sent does not include the paging cause support indication information.

In step S82, the access network device sends the registration request message to the core network device.

In one optional embodiment, the access network device sends the registration request message to the core network device. In one embodiment, the core network device is an AMF.

In step S83, the core network device determines a first capability indication information indicating the capability supported by the core network device.

In one optional embodiment, the core network device determines, based on the received registration request message, whether the registration request message includes the paging cause support indication information. If it is determined that the registration request message includes the paging cause support indication information and that the core network supports the paging cause capability, it is determined that the first capability indication information at least includes information indicating that the core network supports the paging cause capability. If it is determined that the core network also supports the capability of paging rejection, paging time control and paging restriction, it is determined that the first capability indication information also includes information indicating that the core network supports the capability of paging rejection, paging time control, and paging restriction.

In another optional embodiment, the core network device determines, based on the received registration request message, whether the registration request message includes the paging cause support indication information. If it is determined that the registration request message does not include the paging cause support indication information and that the core network does not support capabilities of the paging rejection, the paging time control, and the paging restriction, it is determined not to return information to the multi-card UE.

In step S84, the core network device sends the first capability indication information to the access network device.

In one optional embodiment, the core network device sends the first capability indication information to the access network device.

In step S85, the access network device sends the first capability indication information to the multi-card UE.

In one optional embodiment, the access network device sends the first capability indication information to the multi-card UE.

In an embodiment of the present disclosure, the multi-card UE may report the registration request message, for example, the multi-card UE sends the registration request message including the paging cause support indication information to the access network device, and the access network device sends the registration request message to the core network device. Therefore, the core network can accurately know whether the multi-card UE supports the paging cause capability. In comparison with the related art in which the core network defaults that the UE supports the paging cause capability and thus sends information related to the paging cause to the UE regardless of whether the UE supports the paging cause capability or not, the core network sends the information related to the paging cause to the UE only when the UE supports the paging cause capability, which can greatly reduce the waste of transmission resources and the like. Moreover, if the paging cause support indication information is included in the registration request message to be reported to the core network, there is no need to send additional information to carry the same to be reported to the network, which thus can save transmission resources and power consumption of the communication device.

Figure 9:
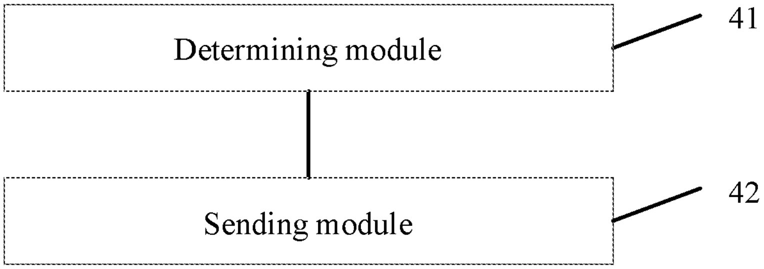
FIG. 9 is a block diagram of a device of processing information according to an exemplary embodiment of the present disclosure.

As shown in FIG. 9, a device of processing information is provided, which includes:

a determining module 41, configured to determine that a multi-card UE supports a paging cause capability; and a sending module 42, configured to send first information to an access network device, the first information including multi-card mode indication information and paging cause support indication information.

The multi-card mode indication information is configured to indicate that the multi-card UE has at least two SIMs in an operational state or that it needs to use a capability supported by the multi-card UE, and the paging cause support indication information is configured to indicate that the multi-card UE supports the paging cause capability.

In some embodiments of the present disclosure, the device of processing information may be a multi-card UE.

An embodiment of the present disclosure provides a device of processing information, which may include:

the determining module 41, configured to determine that the multi-card UE does not support the paging cause capability; and the sending module 42, configured to send second information, the second information not including the paging cause support indication information.

In one embodiment, in comparison with the first information, the second information does not include the paging cause support indication information.

In one embodiment, the first information includes one piece of multi-card capability indication information, and the multi-card capability indication information is configured to indicate a predetermined capability supported by the SIM, in the operational state, in the multi-card UE.

In one embodiment, the first information includes a plurality of pieces of multi-card capability indication information, and different multi-card capability indication information is configured to indicate a different predetermined capability supported by the SIM, in the operational state, in the multi-card UE.

In one embodiment, the predetermined capability includes at least one of: a paging rejection capability; a paging time control capability; and a paging restriction capability.

In one embodiment, the first information includes: a registration request message or a service request message.

In one embodiment, the second information includes: a registration request message or a service request message.

An embodiment of the present disclosure provides a device of processing information, which may include:

the determining module 41, configured to determine that the multi-card UE supports the paging cause capability; and the sending module 42, configured to send the registration request message to the access network device, the registration request message including the multi-card mode indication information and the paging cause support indication information, wherein the multi-card mode indication information is configured to indicate that the multi-card UE has at least two SIMs in an operational state or that it needs to use a capability supported by the multi-card UE, and the paging cause support indication information is configured to indicate that the multi-card UE supports the paging cause capability.

An embodiment of the present disclosure provides a device of processing information, which may include:

the determining module 41, configured to determine that the multi-card UE does not support the paging cause capability; and the sending module 42, configured to send the registration request message to the access network device, the registration request message including the multi-card mode indication information, wherein the multi-card mode indication information is configured to indicate that the multi-card UE has at least two SIMs in an operational state or that it needs to use a capability supported by the multi-card UE.

An embodiment of the present disclosure provides a device of processing information, which may include:

the determining module 41, configured to determine that the multi-card UE supports the paging cause capability; and the sending module 42, configured to send the service request message to the access network device, the service request message including the multi-card mode indication information and the paging cause support indication information, wherein the multi-card mode indication information is configured to indicate that the multi-card UE has at least two SIMs in an operational state or that it needs to use a capability supported by the multi-card UE, and the paging cause support indication information is configured to indicate that the multi-card UE supports the paging cause capability.

An embodiment of the present disclosure provides a device of processing information, which may include:

the determining module 41, configured to determine that the multi-card UE does not support the paging cause capability; and the sending module 42, configured to send the service request message to the access network device, the service request message including the multi-card mode indication information, wherein the multi-card mode indication information is configured to indicate that the multi-card UE has at least two SIMs in an operational state or that it needs to use a capability supported by the multi-card UE.

An embodiment of the present disclosure provides a device of processing information, which may include: the determining module 41, configured to determine that the multi-card UE supports the paging cause capability; and the sending module 42, sending the first information to the core network via the access network.

An embodiment of the present disclosure provides a device of processing information, which may include: the determining module 41, configured to determine that the multi-card UE does not support the paging cause capability; and the sending module 42, sending the second information to the core network via the access network.

Figure 10:
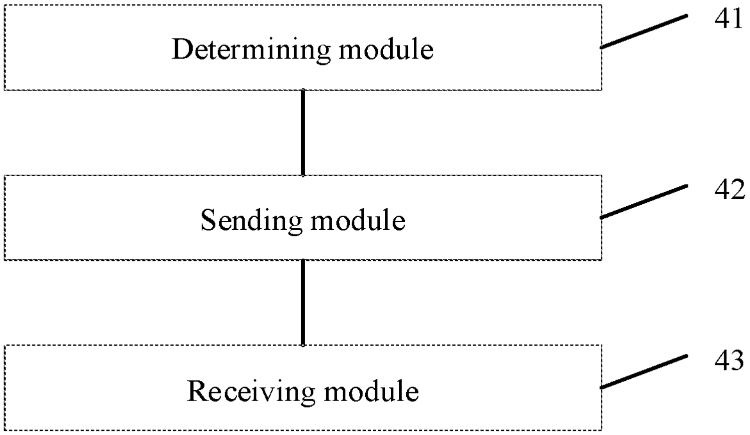
FIG. 10 is a block diagram of a device of processing information according to an exemplary embodiment of the present disclosure.

As shown in FIG. 10, an embodiment of the present disclosure provides a method for processing information, which may include:

a receiving module 43, configured to receive first capability indication information returned by the access network device, wherein the first capability indication information at least includes information indicating that the core network supports the paging cause capability, and the first capability indication information is determined based on the first information.

The device provided in the embodiments of the present disclosure may be executed alone or together with some of the devices in the embodiments of the present disclosure or some of the devices in the related art.

With respect to the device in the above embodiments, the specific manner in which each module performs an operation has been described in detail in the embodiments relating to the method, which will not be described in detail herein.

Figure 11:
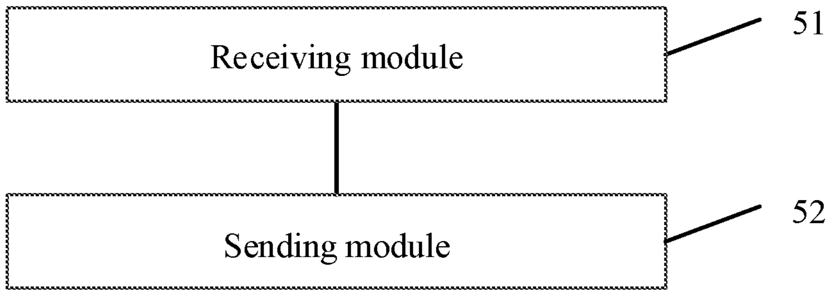
FIG. 11 is a block diagram of a device of processing information according to an exemplary embodiment of the present disclosure.

As shown in FIG. 11, a device of processing information is provided, which includes:

a receiving module 51, configured to receive first information sent by a multi-card UE, the first information including multi-card mode indication information and paging cause indication information, wherein the multi-card mode indication information is configured to indicate that the multi-card UE has at least two SIMs in an operational state or that it needs to use a capability supported by the multi-card UE, and the paging cause support indication information is configured to indicate that the multi-card UE supports the paging cause capability; and a sending module 52, configured to send the first information to a core network device.

In some embodiments of the present disclosure, the device of processing information may be an access network device.

An embodiment of the present disclosure provides a device of processing information including:

the receiving module 51, configured to receive second information sent by the multi-card UE, the second information not including the paging cause support indication information; and the sending module 52, configured to send the second information to the core network device.

In one embodiment, the first information further includes one piece of multi-card capability indication information, and the multi-card capability indication information is configured to indicate a predetermined capability supported by the SIM, in the operational state, in the multi-card UE.

In one embodiment, the first information further includes a plurality of pieces of multi-card capability indication information, and different multi-card capability indication information is configured to indicate a different predetermined capability supported by the SIM, in the operational state, in the multi-card UE.

In one embodiment, the predetermined capability includes at least one of: a paging rejection capability; a paging time control capability; and a paging restriction capability.

In one embodiment, the first information further includes a registration request message or a service request message.

An embodiment of the present disclosure provides a device of processing information including:

the receiving module 51, configured to receive first capability indication information returned by the core network device based on the first information, wherein the first capability indication information at least includes information indicating that the core network supports the paging cause capability; and the sending module 52, configured to send the first capability indication information to the multi-card UE.

The device provided in the embodiments of the present disclosure may be executed alone or together with some of the devices in the embodiments of the present disclosure or some of the devices in the related art.

With respect to the device in the above embodiments, the specific manner in which each module performs an operation has been described in detail in the embodiments relating to the method, which will not be described in detail herein.

Figure 12:
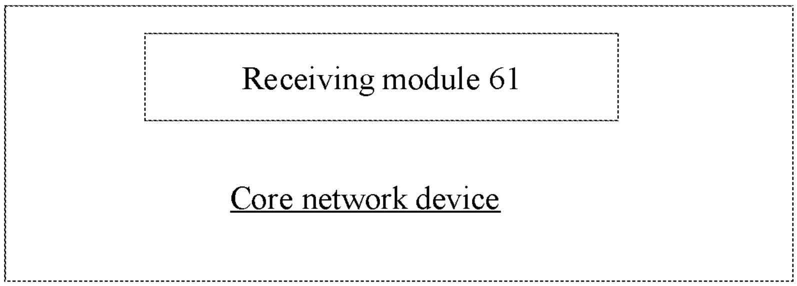
FIG. 12 is a block diagram of a device of processing information according to an exemplary embodiment of the present disclosure.

As shown in FIG. 12, a device of processing information is provided, which includes:

a receiving module 61, configured to receive first information, the first information including multi-card mode indication information and paging cause support indication information, wherein the multi-card mode indication information is configured to indicate that the multi-card UE has at least two SIMs in an operational state or that it needs to use a capability supported by the multi-card UE, and the paging cause support indication information is configured to indicate that the multi-card UE supports the paging cause capability.

In some embodiments of the present disclosure, the device of processing information may be a core network device.

In one embodiment, the first information further includes one piece of multi-card capability indication information, and the multi-card capability indication information is configured to indicate a predetermined capability supported by the SIM, in the operational state, in the multi-card UE.

In one embodiment, the first information further includes a plurality of pieces of multi-card capability indication information, and different multi-card capability indication information is configured to indicate a different predetermined capability supported by the SIM, in the operational state, in the multi-card UE.

In one embodiment, the predetermined capability includes at least one of: a paging rejection capability; a paging time control capability; and a paging restriction capability.

In one embodiment, the first information further includes a registration request message or a service request message.

An embodiment of the present disclosure provides a device of processing information, which may include: the receiving module 61, configured to receive the registration request message sent by an access network device, the registration request message including multi-card mode indication information and paging cause support indication information, wherein the multi-card mode indication information is configured to indicate that the multi-card UE has at least two SIMs in an operational state or that it needs to use a capability supported by the multi-card UE, and the paging cause support indication information is configured to indicate that the multi-card UE supports the paging cause capability.

An embodiment of the present disclosure provides a device of processing information, which may include: the receiving module 61, configured to receive the service request message sent by an access network device, the service request message including multi-card mode indication information and paging cause support indication information, wherein the multi-card mode indication information is configured to indicate that the multi-card UE has at least two SIMs in an operational state or that it needs to use a capability supported by the multi-card UE, and the paging cause support indication information is configured to indicate that the multi-card UE supports the paging cause capability.

Figure 13:
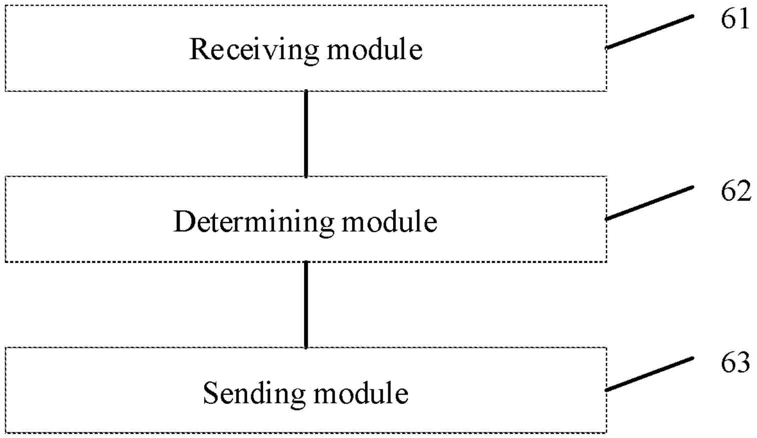
FIG. 13 is a block diagram of a device of processing information according to an exemplary embodiment of the present disclosure.

As shown in FIG. 13, an embodiment of the present disclosure provides a device of processing information, which may include:

a determining module 62, configured to determine that the first information received includes the paging cause support indication information; and a sending module 63, configured to send first capability indication information to the access network device, wherein the first capability indication information at least includes information indicating that the core network supports the paging cause capability.

An embodiment of the present disclosure provides a device of processing information, which may include: the sending module 63 configured to send the first capability indication information to the UE via the access network.

An embodiment of the present disclosure provides a device of processing information, which may include: the receiving module 61 configured to receive second information, the second information not including the paging cause support indication information.

An embodiment of the present disclosure provides a device of processing information, which may include: the receiving module 61, configured to receive the registration request message from access network device, the registration request message including multi-card mode indication information, wherein the multi-card mode indication information is configured to indicate that the multi-card UE has at least two SIMs in an operational state or that it needs to use a capability supported by the multi-card UE.

An embodiment of the present disclosure provides a device of processing information, which may include: the receiving module 61, configured to receive the service request message from access network device, the service request message including multi-card mode indication information, wherein the multi-card mode indication information is configured to indicate that the multi-card UE has at least two SIMs in an operational state or that it needs to use a capability supported by the multi-card UE.

The device provided in the embodiments of the present disclosure may be executed alone or together with some of the devices in the embodiments of the present disclosure or some of the devices in the related art.

With respect to the device in the above embodiments, the specific manner in which each module performs an operation has been described in detail in the embodiments relating to the method, which will not be described in detail herein.

An embodiment of the present disclosure provides a communication device including:

a processor; and a memory for storing executable instructions of the processor.

wherein the processor is configured for implementing the method for processing information according to any embodiment of the present disclosure when running the executable instructions.

In one embodiment, the communication device may be a multi-card UE. In another embodiment, the communication device may be a core network device. In yet another embodiment, the communication device may be an access network device.

The processor may include various types of storage media that are non-transitory computer storage media that can continue to store information thereon after the user equipment is powered down.

The processor may be connected to the memory via a bus or the like for reading an executable program stored on the memory, for example, at least one of the methods as shown in FIGS. 2 to 8.

An embodiment of the present disclosure also provides a computer storage medium, wherein the computer storage medium stores a computer executable program, and the executable program implements the method for processing information (for example, at least one of the methods as shown in FIGS. 2 to 8) according to any embodiment of the present disclosure when being executed by a processor.

With regard to the device and storage medium in the above-mentioned embodiment, the specific manner in which the individual modules perform their operations has been described in detail in the embodiment concerning the method and will not be described in detail here.

Figure 14:
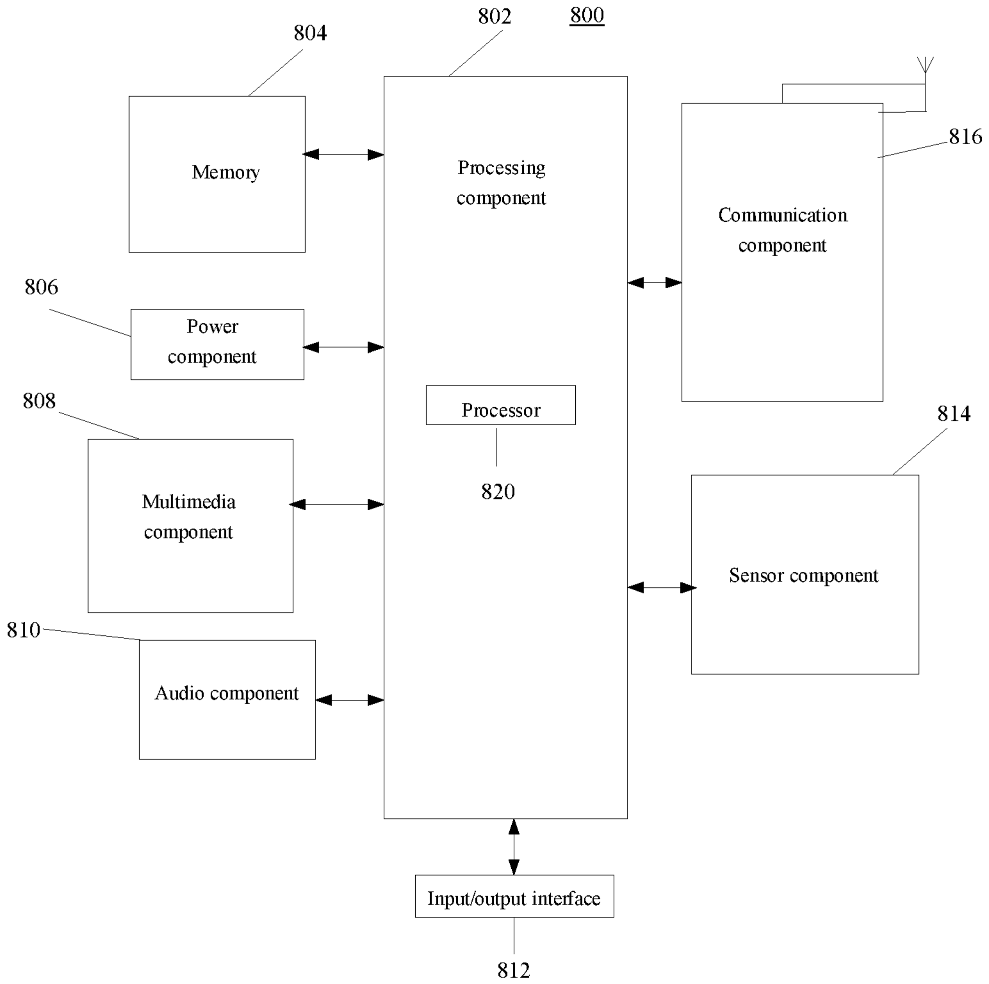
FIG. 14 is a block diagram of a UE according to an exemplary embodiment of the present disclosure.

FIG. 14 is a block diagram of a user equipment 800 according to an embodiment. For example, the user equipment may specifically be a mobile phone, a computer, a digital broadcasting terminal, a messaging device, a game console, a tablet device, a medical device, a fitness device, a personal digital assistant, or the like.

Referring to FIG. 14, the user equipment 1 800 may include one or more of a processing component 802, a memory 804, a power component 806, a multimedia component 808, an audio component 810, an input/output (I/O) interface 812, a sensor component 814, and a communication component 816.

The processing component 802 generally controls the overall operations of the user equipment 800, such as operations associated with display, telephone calls, data communications, camera operations, and recording operations. The processing component 802 may include one or more processors 820 to execute instructions to complete all or part of the steps of the foregoing method. In addition, the processing component 802 may include one or more modules to facilitate interaction between the processing component 802 and other components. For example, the processing component 802 may include a multimedia module to facilitate the interaction between the multimedia component 808 and the processing component 802.

The memory 804 is configured to store various types of data to support the operation at the user equipment 800. Examples of these data include instructions for any application or method operating on the user equipment 800, contact data, phone book data, messages, pictures, videos and the like. The memory 804 may be implemented by any type of volatile or non-volatile storage device or a combination thereof, such as static random access memory (SRAM), electrically erasable programmable read-only memory (EEPROM), erasable and programmable read-only memory (EPROM), programmable read-only memory (PROM), read-only memory (ROM), magnetic memory, flash memory, magnetic disk or optical disk.

The power component 806 provides power to various components of the user equipment 800. The power component 806 may include a power management system, one or more power supplies, and other components associated with generating, managing, and distributing power for the user equipment 800.

The multimedia component 808 includes a screen that provides an output interface between the user equipment 800 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor may not only sense the boundary of the touch or slide action, but also detect the duration and pressure related to the touch or slide operation. In some embodiments, the multimedia component 808 includes a front camera and/or a rear camera. When the user equipment 800 is in an operation mode, such as a shooting mode or a video mode, the front camera and/or the rear camera can receive external multimedia data. Each front camera and rear camera may be a fixed optical lens system or have focal length and optical zoom capabilities.

The audio component 810 is configured to output and/or input audio signals. For example, the audio component 810 includes a microphone (MIC), and when the user equipment 800 is in an operation mode, such as a call mode, a recording mode, and a voice recognition mode, the microphone is configured to receive an external audio signal. The received audio signal can be further stored in the memory 804 or sent via the communication component 816. In some embodiments, the audio component 810 further includes a speaker for outputting audio signals.

The I/O interface 812 provides an interface between the processing component 802 and a peripheral interface module. The above-mentioned peripheral interface module may be a keyboard, a click wheel, a button, and the like. These buttons may include but are not limited to home button, volume button, start button, and lock button.

The sensor component 814 includes one or more sensors for providing the user equipment 800 with various aspects of state evaluation. For example, the sensor component 814 can detect the on/off status of the user equipment 800 and the relative positioning of components. For example, the component is a display and keypad of the user equipment 800. The sensor component 814 can also detect the position change of the user equipment 800 or a component of the user equipment 800, the presence or absence of contact between the user and the user equipment 800, the orientation or acceleration/deceleration of the user equipment 800, and the temperature change of the user equipment 800. The sensor component 814 may include a proximity sensor configured to detect the presence of nearby objects when there is no physical contact. The sensor component 814 may also include a light sensor, such as a CMOS or CCD image sensor, for use in imaging applications. In some embodiments, the sensor component 814 may also include an acceleration sensor, a gyroscope sensor, a magnetic sensor, a pressure sensor, or a temperature sensor.

The communication component 816 is configured to facilitate wired or wireless communication between the user equipment 800 and other devices. The user equipment 800 can access a wireless network based on a communication standard, such as WiFi, 2G, 3G, 4G or 5G or a combination thereof. In an embodiment, the communication component 816 receives a broadcast signal or broadcast related information from an external broadcast management system via a broadcast channel. In an embodiment, the communication component 816 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an embodiment, the user equipment 800 may be implemented by one or more of application specific integrated circuit (ASIC), digital signal processor (DSP), digital signal processing device (DSPD), programmable logic devices (PLD), field programmable gate array (FPGA), controller, microcontroller, microprocessor, or other electronic components, to perform the above-mentioned methods.

An embodiment also provides a non-transitory computer-readable storage medium including instructions, such as the memory 804 including instructions, and the instructions may be executed by the processor 820 of the user equipment 800 to complete the foregoing method. For example, the non-transitory computer-readable storage medium may be ROM, random access memory (RAM), CD-ROM, magnetic tape, floppy disk, optical data storage device and the like.

Figure 15:
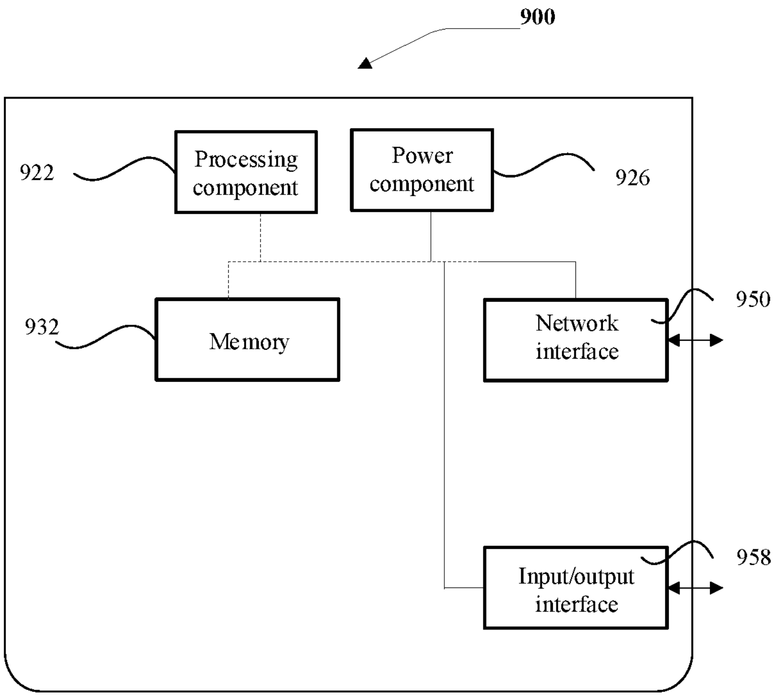
FIG. 15 is a block diagram of a base station according to an exemplary embodiment of the present disclosure.

As shown in FIG. 15, an embodiment of the present disclosure provides a structure of a base station. For example, the base station 900 may be provided as a network-side device. Referring to FIG. 15, the base station 900 includes a processing component 922 which further includes one or more processors, and a memory resource which is represented by a memory 932 and is configured for storing instructions such as application programs executable by the processing component 922. The application program stored in the memory 932 may include one or more modules each corresponding to a set of instructions. Furthermore, the processing component 922 is configured to execute instructions to perform any of the above methods that are performed at the base station side, for example, the method shown in FIGS. 4 to 10.

The base station 900 may also include a power component 926 configured to perform power management of the base station 1900, a wired or wireless network interface 950 configured to connect the base station 900 to a network, and an input/output (I/O) interface 958. The base station 900 may operate based on an operating system stored in memory 932, such as Windows Server™, Mac OS X™, Unix™, Linux™, Free BSD™ or the like.

The present disclosure is intended to cover any variations, uses, or adaptations of the present disclosure that follow the general principles of the present disclosure and include the common general knowledge or conventional technical means in the technical field not disclosed by the present disclosure. The specification and embodiments are to be regarded as exemplary only, with the true scope and spirit of the present disclosure being indicated by the following claims.

It is to be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. A method for processing information, comprising:

determining, by a multi-card user equipment (UE), whether the multi-card UE itself supports a capability of receiving a paging cause;

in response to determining, by the multi-card UE, that the multi-card UE supports the capability of receiving the paging cause, sending, by the multi-card UE, first information to an access network device, wherein the first information carries multi-card mode indication information and paging cause support indication information, the multi-card mode indication information is configured to indicate that the multi-card UE has at least two SIMs in an operational state or that the multi-card UE needs to use a capability supported by the multi-card UE, and the paging cause support indication information is configured to indicate that the multi-card UE supports the capability of receiving the paging cause; and in response to determining, by the multi-card UE, that the multi-card UE does not support the capability of receiving the paging cause, sending, by the multi-card UE, second information to the access network device, wherein the second information does not carry the paging cause support indication information, wherein the first information and the second information are of a same message type and each of the first information and the second information is a registration request message or a service request message, and wherein the multi-card mode indication information is indicated by a first one or more bits in the first information and the second information, and the paging cause support indication information is indicated by a second one or more bits in the first information.

2. The method according to claim 1, wherein the first information further comprises one piece of multi-card capability indication information, and the one piece of multi-card capability indication information is configured to indicate a predetermined capability supported by the SIM in the operational state in the multi-card UE, wherein the predetermined capability comprises at least one of:

a paging rejection capability;

a paging time control capability; or a paging restriction capability.

3. The method according to claim 1, wherein the first information further comprises a plurality of pieces of multi-card capability indication information, and different pieces of multi-card capability indication information are configured to indicate different predetermined capabilities supported by the SIM in the operational state in the multi-card UE, wherein the predetermined capability comprises at least one of:

a paging rejection capability;

a paging time control capability; or a paging restriction capability.

4. The method according to claim 1, further comprising:

receiving, by the multi-card UE, first capability indication information returned by the access network device, wherein the first capability indication information at least comprises information indicating that a core network supports a paging cause capability, and wherein the first capability indication information is determined based on the first information.

5. A communication device, comprising:

a processor; and a memory storing executable instructions by the processor, wherein the processor is configured to, when running the executable instructions, implement the method for processing information according to claim 1.

6. A non-transitory computer storage medium having a computer executable program stored thereon that, when being executed by a processor, implements the method for processing information according to claim 1.

7. A method for processing information, comprising:

in response to receiving, by an access network device, first information sent by a multi-card UE, sending, by the access network device, the first information to a core network device, wherein the first information is sent by the multi-card UE in response to determining that the multi-card UE itself supports a capability of receiving a paging cause, and carries multi-card mode indication information and paging cause support indication information, the multi-card mode indication information is configured to indicate that the multi-card UE has at least two SIMs in an operational state or that the multi-card UE needs to use a capability supported by the multi-card UE, and the paging cause support indication information is configured to indicate that the multi-card UE supports the capability of receiving the paging cause; and in response to receiving, by the access network device, second information sent by the multi-card UE, sending, by the access network device, the second information to the core network device, wherein the second information is sent by the multi-card UE in response to determining that the multi-card UE itself does not support the capability of receiving the paging cause and does not carry the paging cause support indication information, wherein the first information and the second information are of a same message type and each of the first information and the second information is a registration request message or a service request message, and wherein the multi-card mode indication information is indicated by a first one or more bits in the first information and the second information, and the paging cause support indication information is indicated by a second one or more bits in the first information.

8. The method according to claim 7, wherein the first information further comprises one piece of multi-card capability indication information, and the one piece of multi-card capability indication information is configured to indicate a predetermined capability supported by the SIM in the operational state in the multi-card UE, wherein the predetermined capability comprises at least one of:

a paging rejection capability;

a paging time control capability; or a paging restriction capability.

9. The method according to claim 7, wherein the first information further comprises a plurality of pieces of multi-card capability indication information, and different pieces of multi-card capability indication information are configured to indicate different predetermined capabilities supported by the SIM in the operational state in the multi-card UE, wherein the predetermined capability comprises at least one of:

a paging rejection capability;

a paging time control capability; or a paging restriction capability.

10. The method according to claim 7, further comprising:

receiving, by the access network device, first capability indication information returned by the core network device based on the first information, wherein the first capability indication information at least comprises information indicating that the core network supports a paging cause capability; and sending, by the access network device, the first capability indication information to the multi-card UE.

11. A method for processing information, comprising:

receiving, by a core network device, first information sent by an access network device, wherein the first information is sent to the access network device by a multi-card UE in response to determining that the multi-card UE itself supports a capability of receiving a paging cause, and carries multi-card mode indication information and paging cause support indication information, the multi-card mode indication information is configured to indicate that the multi-card UE has at least two SIMs in an operational state or that the multi-card UE needs to use a capability supported by the multi-card UE, and the paging cause support indication information is configured to indicate that the multi-card UE supports the capability of receiving the paging cause; and receiving, by the core network device, second information sent by the access network device, wherein the second information is sent to the access network device by the multi-card UE in response to determining that the multi-card UE itself does not support the capability of receiving the paging cause, and does not carry the paging cause support indication information, wherein the first information and the second information are of a same message type and each of the first information and the second information is a registration request message or a service request message, and wherein the multi-card mode indication information is indicated by a first one or more bits in the first information and the second information, and the paging cause support indication information is indicated by a second one or more bits in the first information.

12. The method according to claim 11, wherein the first information further comprises one piece of multi-card capability indication information, and the one piece of multi-card capability indication information is configured to indicate a predetermined capability supported by the SIM, in the operational state, in the multi-card UE, wherein the predetermined capability comprises at least one of:

a paging rejection capability;

a paging time control capability; or a paging restriction capability.

13. The method according to claim 11, wherein the first information further comprises a plurality of pieces of multi-card capability indication information, and different pieces of multi-card capability indication information are configured to indicate different predetermined capabilities supported by the SIM in the operational state in the multi-card UE, wherein the predetermined capability comprises at least one of:

a paging rejection capability;

a paging time control capability; or a paging restriction capability.

14. The method according to claim 11, further comprising:

determining, by the core network device, that the first information received comprises the paging cause support indication information; and sending, by the core network device, first capability indication information to the access network device, wherein the first capability indication information at least comprises information indicating that the core network supports a paging cause capability.

* * * * *